(12) United States Patent
Liu et al.

(10) Patent No.: US 12,709,481 B2
(45) Date of Patent: Aug. 18, 2026

(54) CONTAINER CONVEYING SYSTEM AND ROBOT

(71) Applicant: BEIJING GEEKPLUS TECHNOLOGY CO., LTD., Beijing (CN)

(72) Inventors: Kai Liu, Beijing (CN); Qiming Wang, Beijing (CN); Zhihui Qin, Beijing (CN); Nan Zhang, Beijing (CN); Yuhui Xiao, Beijing (CN); Xiaowei Li, Beijing (CN); Xi Chen, Beijing (CN); Pengfei Wang, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 494 days.

(21) Appl. No.: 18/273,521

(22) PCT Filed: Jan. 21, 2022

(86) PCT No.: PCT/CN2022/073277
§ 371 (c)(1),
(2) Date: Jul. 20, 2023

(87) PCT Pub. No.: WO2022/156780
PCT Pub. Date: Jul. 28, 2022

(65) Prior Publication Data

US 2024/0092579 A1 Mar. 21, 2024

(30) Foreign Application Priority Data

Jan. 21, 2021 (CN) ......................... 202120169819.6
Mar. 10, 2021 (CN) ......................... 202120509197.7

(Continued)

(51) Int. Cl.
*B65G 1/137* (2006.01)
*B65G 1/04* (2006.01)

(52) U.S. Cl.
CPC ......... *B65G 1/1375* (2013.01); *B65G 1/0492* (2013.01)

(58) Field of Classification Search
CPC ..... B65G 1/1373; B65G 1/0421; B66F 9/063; B66F 9/0755; B66F 9/122; B66F 9/183
See application file for complete search history.

(56) References Cited

U.S. PATENT DOCUMENTS 9,327,952 B1 * 5/2016 Kolharkar ............ B65G 1/0435
9,896,267 B2 2/2018 Nakamura et al.

(Continued)

FOREIGN PATENT DOCUMENTS

CN 202988649 U 6/2013
CN 214932938 U 7/2013

(Continued)

OTHER PUBLICATIONS

Search report and office action issued by the China National Intellectual Property Administration for application 202110553883.9 on Nov. 29, 2024.

(Continued)

*Primary Examiner* — Kyle O Logan
(74) *Attorney, Agent, or Firm* — Cozen O'Connor

(57) ABSTRACT

A container conveying system including a controller, a first robot, and/or a second robot. A first container pickup mechanism is provided on the first robot. A second container pickup mechanism is provided on the second robot. The controller is configured to, in response to a container conveying request, send a first conveying instruction to the first robot if it is determined a target container to be conveyed based on the container conveying request has a size within (Continued)

a first size range; or send a second conveying instruction to the second robot if it is determined the target has a size within a second size range. In warehousing operation scenarios, by jointly using the two robots for operation, containers with various container sizes can be picked up and placed, thus improving utilization rate of a container storage space.

20 Claims, 20 Drawing Sheets

(30) Foreign Application Priority Data

May 20, 2021 (CN) ......................... 202110553883.9
Jun. 10, 2021 (CN) ......................... 202121304572.0
Jul. 7, 2021 (CN) ......................... 202121532346.8
Sep. 9, 2021 (CN) ......................... 202111058253.0

(56) References Cited

U.S. PATENT DOCUMENTS 11,932,487 B2 3/2024 Zhan et al.
11,945,706 B2 4/2024 Kong et al.
2003/0091411 A1 5/2003 Diehm
2006/0245862 A1* 11/2006 Hansl .................. B65G 1/0435 414/281
2018/0057283 A1 3/2018 Peters et al.
2018/0127212 A1* 5/2018 Jarvis ..................... G05D 1/247
2019/0196511 A1* 6/2019 Millhouse ............ G01C 21/005
2019/0352092 A1 11/2019 Zheng et al.
2020/0078936 A1* 3/2020 Wu ...................... B65G 1/0492
2020/0324972 A1* 10/2020 Cheng .................. B65G 1/0435
2022/0332502 A1 10/2022 Liu
2023/0211949 A1 7/2023 Xiao et al.
2023/0286752 A1 9/2023 Lin et al.

FOREIGN PATENT DOCUMENTS

CN 105314310 A 2/2016
CN 105858034 A 8/2016
CN 106934932 A 7/2017
CN 206970149 U 2/2018
CN 108033405 A 5/2018
CN 208326635 U 1/2019
CN 110065761 A 7/2019
CN 209192822 U 8/2019
CN 209522153 U 10/2019
CN 209618093 U 11/2019
CN 111137610 A 5/2020
CN 111137808 A 5/2020
CN 111169880 A 5/2020
CN 210457347 U 5/2020
CN 210504192 U 5/2020
CN 111348362 A 6/2020
CN 211337446 U 8/2020
CN 111605958 A 9/2020
CN 111703798 A 9/2020
CN 111703799 A 9/2020
CN 212197049 U 12/2020
CN 212402315 U 1/2021
CN 212655100 U 3/2021
CN 212952423 U 4/2021
CN 112758588 A 5/2021
CN 213650798 U 7/2021
CN 214648653 U 11/2021
CN 214651060 U 11/2021
CN 215286573 U 12/2021
CN 215361551 U 12/2021
CN 215624515 U 1/2022
CN 216154654 U 4/2022
CN 216582519 U 5/2022
CN 218023532 U 12/2022
JP H0624516 A 2/1994
JP 2007070006 A 3/2007
TW M618837 U 11/2021
TW M618839 U 11/2021
TW 202223786 A 6/2022
WO WO2020124592 A1 6/2020
WO WO2020156392 A1 8/2020
WO WO2020156393 A1 8/2020
WO WO2021227551 A1 11/2021
WO WO2021249163 A1 12/2021

OTHER PUBLICATIONS

English translation of the Search report and office action issued by the China National Intellectual Property Administration for application 202110553883.9 on Nov. 29, 2024.
Extended Search Report issued by the European Patent Office for application 22837066.4 on Dec. 16, 2024.
Partial Supplementary Search Report issued by the European Patent Office for application 22837066.4 on Sep. 24, 2024.
International Search Report and Written Opinion issued for PCT/CN2022/073277 on Mar. 30, 2022.
First office action and Search report issued by the CNIPA for application CN 202111058253.0 on Jul. 28, 2025; Informal translation included.
Patent Examination Report issued by the New Zealand Intellectual Property Office for application 802262 on Feb. 27, 2025.
Search Report and Office action issued by the CNIPA for application CN 202111015903.3 on Apr. 30, 2025; translation included.
International Search Report and Written Opinion issued for PCT/CN2022/104749 on Sep. 21, 2022; translation included.
International Search Report and Written Opinion issued for PCT/CN2022/104748 on Sep. 15, 2022; translation included.
Search report and office action issued by the Taiwan Intellectual Property Office for application 11120984410 on Oct. 5, 2023.
English translation of the search report and office action issued by the Taiwan Intellectual Property Office for application 11120984410 on Oct. 5, 2023.
Office action issued by the UK Intellectual Property Office for application GB 2311726.0 on Jul. 9, 2024.

* cited by examiner

32
A
7
34
35
6
6
31
311

CONTAINER CONVEYING SYSTEM AND ROBOT

CROSS-REFERENCE TO RELATED APPLICATIONS

This application is the national phase of International Application No. PCT/CN2022/073277, titled "CONTAINER CONVEYING SYSTEM AND ROBOT", filed on Jan. 21, 2022, which claims priorities and rights to Chinese Patent Application No. 202120169819.6 filed on Jan. 21, 2021, Chinese Patent Application No. 202120509197.7 filed on Mar. 10, 2021, Chinese Patent Application No. 202110553883.9 filed on May 20, 2021, Chinese Patent Application No. 202121304572.0 filed on Jun. 10, 2021, Chinese Patent Application No. 202121532346.8 filed on Jul. 7, 2021, and Chinese Patent Application No. 202111058253.0 filed on Sep. 9, 2021, which are incorporated herein by reference in their entirety.

TECHNICAL FIELD

The present disclosure is applied to the field of robot task scheduling, and in particular to a container conveying system.

BACKGROUND

In warehousing operation scenarios, it is often necessary to convey containers with various sizes. In a case that a robot is used for conveying containers with various sizes on the site, the container pickup capacity of the container pickup mechanism provided on the robot needs to adapt to the maximum size of the various container sizes, which will inevitably result in waste of the capacity of the container pickup mechanism. In addition, the size of the container pickup mechanism is also set large due to the need to convey the container with the maximum size, resulting in using a storage space that matches the maximum size of the container to store relatively smaller containers. This may lead to waste of a container storage space and low utilization rate of the container storage space.

SUMMARY

The purpose of the present disclosure is to provide a container conveying system to overcome the defect of low utilization rate of a container storage space in warehousing operation scenarios.

In a first aspect, the present disclosure provides a container conveying system, which includes containers with various container sizes, a controller, a first robot and a second robot; a first container pickup mechanism is provided on the first robot, and a second container pickup mechanism is provided on the second robot.

The first robot is capable of conveying containers with sizes within a first size range, and the second robot is capable of conveying containers with sizes within a second size range.

The controller is configured to, in response to a container conveying request, send a first conveying instruction to the first robot in a case that it is determined that the size of a target container to be conveyed in the container conveying request is within the first size range; and send a second conveying instruction to the second robot in a case that it is determined that the size of the target container to be conveyed in the container conveying request is within the second size range.

The first robot is configured to use the first container pickup mechanism to acquire and convey the target container in response to the first conveying instruction.

The second robot is configured to use the second container pickup mechanism to acquire and convey the target container in response to the second conveying instruction.

The container conveying system provided by the present disclosure at least has the following beneficial effects:

since the first robot and the second robot can convey containers within different size ranges, in the warehousing operation scenarios, by jointly using the first robot and the second robot for operation, containers with various container sizes can be picked up and placed, thus improving the utilization rate of a container storage space.

In order to make the purposes, features and advantages of the present disclosure more obvious and understandable, a detailed description will be made below in combination with exemplary embodiments with reference to the drawings.

DETAILED DESCRIPTION

Figure 1A:
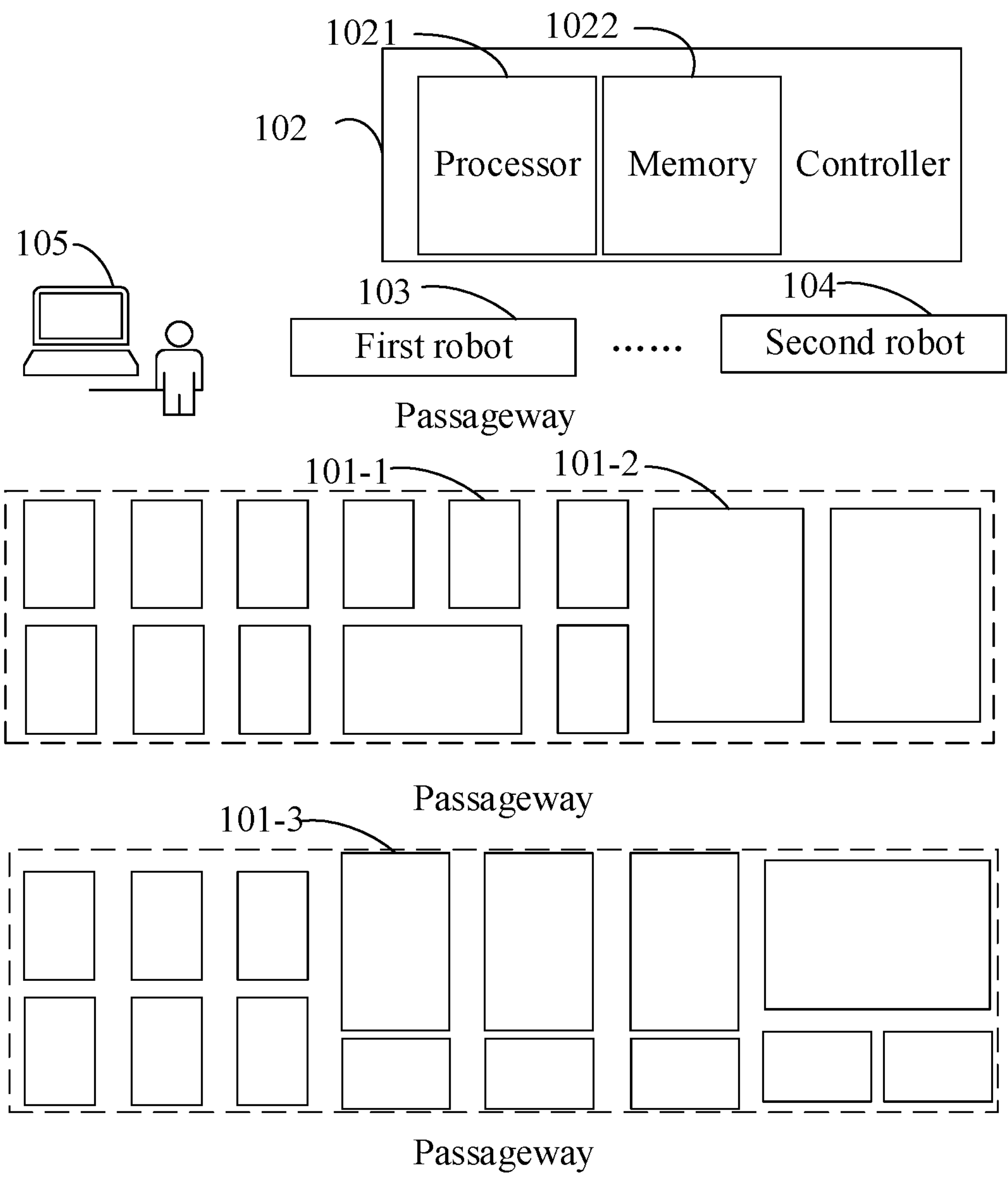
FIG. 1A illustrates a schematic diagram of a container conveying system provided by the present disclosure.

To make the purposes, technical solutions and advantages of the present disclosure clearer, the technical solutions in the present application will be clearly and completely described below with reference to the drawings in the embodiments of the present. The described embodiments are merely some rather than all of the embodiments of the present disclosure. Usually, the components described and illustrated in the drawings herein may be disposed and designed in various configurations. Therefore, the following detailed description of the present disclosure provided in the drawings is not intended to limit the scope of protection of the present disclosure, but only to describe the selected embodiments of the present disclosure. All other embodiments obtained by those skilled in the art based on the embodiments of the present disclosure without contributing any inventive labor still fall within the scope of protection of the present disclosure.

Terms such as "first" and "second" in the description, claims and drawings of the present disclosure are used for distinguishing similar objects, instead of describing a specific order or sequence. It is to be understood that the data used in this way may be interchanged in appropriate cases, so that the embodiments described here can be implemented in order other than the content illustrated or described here.

The term "a plurality of or several" mentioned herein refers to two or more. The term "and/or" describes the association relationship of associated objects, representing that there may be three relationships. For example, A and/or B may represent that A exists alone, A and B exist simultaneously, and B exists alone. The character '/' generally represents that associated objects are in an 'or' relationship.

As found by research, in warehousing operation scenarios, it is often necessary to convey containers with various sizes. In a case that a robot is used for conveying containers with various sizes on the site, the container pickup capacity of the container pickup mechanism provided on the robot needs to adapt to the maximum size of various container sizes, which will inevitably result in waste of the capacity of the container pickup mechanism. In addition, the size of the container pickup mechanism is also set large due to the need to convey the container with the largest size, resulting in using a storage space that matches the largest size of the container to store relatively smaller containers. This may lead to waste of a container storage space and low utilization rate of a container storage space.

Based on the above research, the present disclosure provides a container conveying system. In warehousing operation scenarios, by jointly using the first robot and the second robot for operation, containers with various container sizes can be picked up and placed, thus improving the utilization rate of a container storage space.

The defects of the above solutions are all the results of the practice and careful study of the inventor. Therefore, the discovery process of the above problems and the solutions proposed in the present disclosure below should all be regarded as contributions made by the inventor to the present disclosure.

It is to be understood that similar reference signs and letters represent similar items in the following drawings. Therefore, once an item is defined in one drawing, it does not need to be further defined or explained in subsequent drawings.

To help to understand the present disclosure, firstly a container conveying system disclosed in the present disclosure will be described in detail. Each of a first robot and a second robot provided by the present disclosure may include a microcontroller with certain computing power. In some possible embodiments, the first robot and the second robot may be implemented through a microcontroller control mode.

Referring to FIG. 1A, it illustrates a schematic diagram of a container conveying system provided by the present disclosure. The system includes containers with various container sizes (such as container 101-1, container 101-2 and container 101-3), a controller 102, a first robot 103 and a second robot 104. A first container pickup mechanism is provided on the first robot 103. A second container pickup mechanism is provided on the second robot 104. The first container pickup mechanism and the second container pickup mechanism are configured to acquire containers and can achieve container conveying.

Containers 101 conveyed in the present disclosure may be rectangular containers. The container size may be length*width*height of a rectangular container, or it may be the size of any one of long, wide and high sides of a rectangular container. It may be selected according to the actual application scenario, which is not limited here.

Here, the first robot is capable of conveying containers with sizes within a first size range. The first size range may include a range composed of a first size threshold and a second size threshold. The second size threshold is greater than the first size threshold. The range composed of the first size threshold and the second size threshold may be a container size range corresponding to the container 101-1. Here, the second robot is capable of conveying containers with sizes within a second size range. The second size range may include a range composed of a third size threshold and a fourth size threshold. The fourth size threshold is greater than the third size threshold. The range composed of the third size threshold and the fourth size threshold may be a container size range corresponding to the container 101-2, or a container size range corresponding to the container 101-3. The first size threshold, the second size threshold, the third size threshold and the fourth size threshold may be set according to management experience or actual needs, which are not limited in the present disclosure.

Here, the second size threshold may be less than or equal to the third size threshold.

The controller 102 may be configured on a server, be independently provided, or be provided on the first robot or second robot to respond to a container conveying request sent by a console 105.

In a case that the controller 102 is configured on a server, the controller 102 may be a software system running on the server and having data storage and information processing capabilities, which may be connected to the first robot and the second robot, a hardware input system and other software systems through wireless or wired connections. The controller 102 includes a processor 1021 and a memory 1022. The memory 1022 can store the container size of each container in a warehouse.

In a possible embodiment, in a case that the controller 102 can only provide the size range of a target container, the controller 102 is configured to, in response to a container conveying request, send a first conveying instruction to the first robot in a case that it is determined that the size of the target container to be conveyed in the container conveying request is within the first size range; and send a second conveying instruction to the second robot in a case that it is determined that the size of the target container to be conveyed in the container conveying request is within the second size range.

The container conveying request may include a target container position and/or a target container size.

In a possible embodiment, in a case that the controller 102 can provide the specific target container size of a target container, the controller is configured to determine the target container size of the target container in a case that it is determined that the size of the target container to be conveyed in the container conveying request is within the first size range, and generate the first conveying instruction based on the target container size; determine the target container size of the target container in a case that it is determined that the size of the target container to be conveyed in the container conveying request is within the second size range, and generate the second conveying instruction based on the target container size.

In specific implementation, referring to FIG. 1A, an operator may make the controller 102 work through the console 105, and the controller 102 communicates with the first robot 103 and the second robot 104 wirelessly, and sends the first conveying instruction to the first robot 103 and the second conveying instruction to the second robot 104 to control the joint operation of the first robot and the second robot, thus completing the conveying of containers with various container sizes.

Here, the first size range and the second size range may be set based on management experience or actual needs, which are not limited in the present disclosure.

Figure 1B:
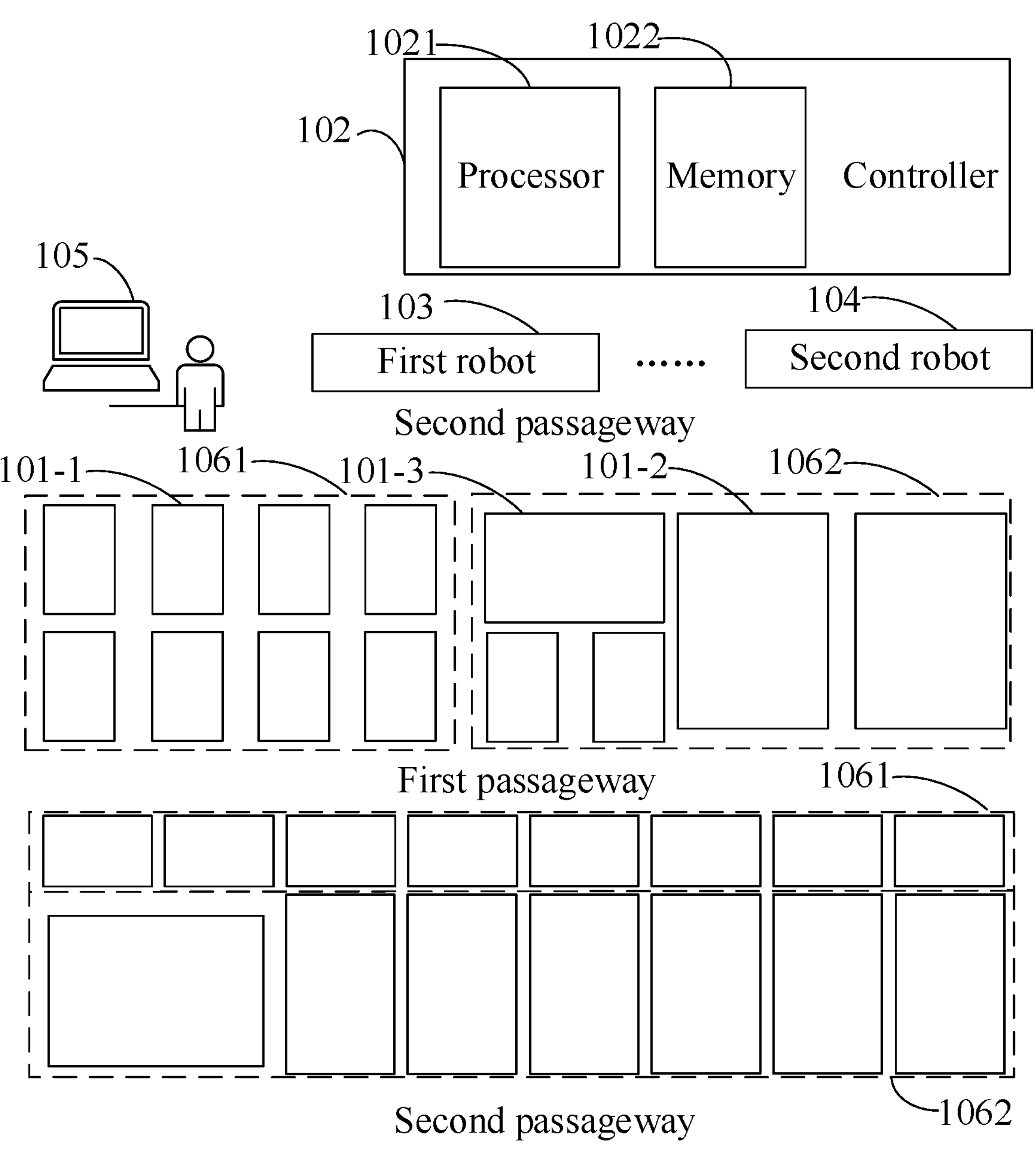
FIG. 1B illustrates a schematic diagram of an application scenario of joint operation by a first robot and a second robot provided by the present disclosure.

In a possible embodiment, in order to improve the utilization rate of the warehouse space, the present disclosure divides shelves storing containers into a first storage space 1061 and a second storage space 1062. Goods may be packaged into containers with different sizes based on the type and/or model of the goods, as illustrated in FIG. 1B, it illustrates a schematic diagram of an application scenario of joint operation of the first robot and the second robot. Containers within the first size range are stored in the first storage space 1061, and containers within the second size range are stored in the second storage space 1062.

In specific implementation, the controller 102 determines the position of the target container based on the container conveying request; in a case that it is determined that the target container is located in the first storage space 1061 based on the target position information, sends a first running instruction to the first robot; and in a case that it is determined that the target container is located in the second storage space 1062 based on the target position information, sends a second running instruction to the second robot. The first storage space 1061 can store containers with sizes within the first size range, and the second storage space 1062 can store containers with sizes within the second size range. The first running instruction includes movement path information of the first robot. The second running instruction includes movement path information of the second robot.

Specifically, the first running instruction may be that the controller 102 instructs the first robot to acquire and convey the target container stored in the first storage space 1061 according to a first movement path; the second running instruction may be that the controller 102 instructs the second robot to acquire and convey the target container stored in the second storage space 1062 according to a second movement path.

Here, the working personnel may use the console 105 to make the controller 102 work. The controller 102 communicates wirelessly with the first robot 103 and the second robot 104, and plans movement paths for the first robot 103 and the second robot 104 based on the target container position. The first robot may run on the first passageway or the second passageway, that is, the first movement path is set on the first passageway or the second passageway. The second robot may only run on the second passageway, that is, the second movement path may only be set on the second passageway. It is to be noted that the width value of the first passageway is smaller than the width value of the second passageway, and the width set for the first passageway can only allow the first robot to pass through, which can save the warehouse space. Further, in order to facilitate the planning of the first movement path of the first robot 103 and the second movement path of the second robot 104, the first passageway and the second passageway may be divided into several sub-regions (i.e., cells), and the first robot 103 and the second robot 104 move cell by cell to form a movement trajectory.

The first robot 103 is configured to use the first container pickup mechanism to acquire and convey the target container in response to the first conveying instruction.

In a possible embodiment, in a case that the container pickup size of the first container pickup mechanism provided on the first robot 103 is not adjustable, the container pickup size of the first container pickup mechanism may be fixed to be greater than or equal to the first size threshold and less than the second size threshold. In this case, the first container pickup mechanism can convey containers with container sizes greater than or equal to the first size threshold and less than the second size threshold. The first robot uses the first container pickup mechanism with unadjustable container pickup size to acquire and convey the target container in response to the first conveying instruction.

Exemplarily, the container pickup size of the first container pickup mechanism provided on the first robot is 650 mm*500 mm*400 mm. The first robot can convey containers or goods with sizes less than 650 mm*500 mm*400 mm. The first robot can use the first container pickup mechanism to convey containers with different sizes such as 600 mm*400 mm*400 mm, 600 mm*450 mm*350 mm or 600 mm*450 mm*400 mm in response to the first conveying instruction.

In a possible embodiment, in a case that the container pickup size of the first container pickup mechanism provided on the first robot 103 is adjustable, a first telescopic arm hooking mechanism provided on the first container pickup mechanism can be used to convey containers with any size within the first size range. In specific implementation, in a case that the first conveying instruction provides the target container size of the target container to the first robot, the first robot is configured to adjust the container pickup size of the first container pickup mechanism to match the target container size in response to the first conveying instruction, and use the adjusted first container pickup mechanism to acquire and convey the target container.

Here, the first container pickup mechanism comprises a first telescopic arm hooking mechanism, a first adjustment mechanism and a third motor. The third motor is connected with the first adjustment mechanism. The first adjustment mechanism drives the first telescopic arm hooking mechanism to move along the moving direction of the first robot under the drive of the third motor to adjust the container pickup size of the first container pickup mechanism. For the specific structure of the first adjustment mechanism, referring to the specific structure of the second adjustment mechanism described below, which will not be repeated here.

In a possible embodiment, the container conveying system may be provided with only the first robot 103, or may be provided with only the second robot 104. A container pickup size of the corresponding first container pickup mechanism is adjustable in a case that the container conveying system is only provided with the first robot 103; a container pickup size of the corresponding second container pickup mechanism is adjustable in a case that the container conveying system is only provided with the second robot 104.

Figure 5A:
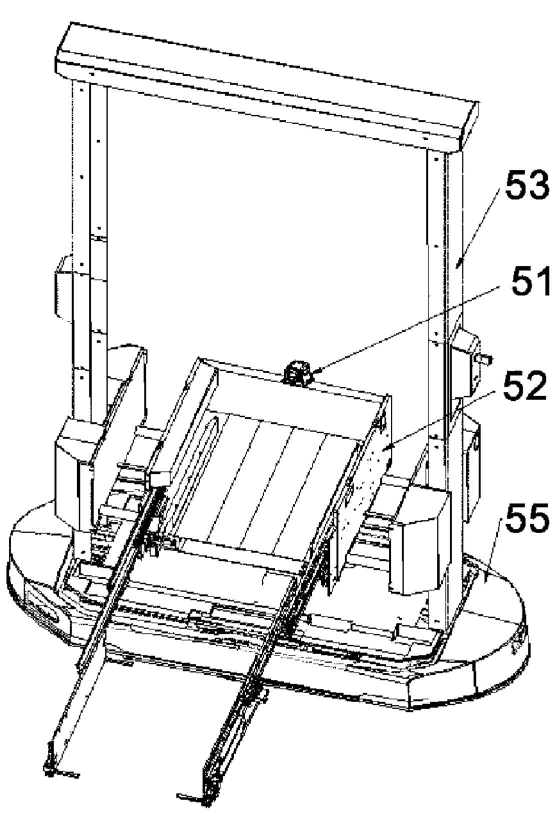
FIG. 5A illustrates a schematic structural diagram of a second robot provided with a first sensor component provided by the present disclosure.

In a possible embodiment, in a case that the first conveying instruction does not provide the target container size of the target container to the first robot, the first robot may also detect the target container size of the target container through a third sensor component, and complete the task of acquiring and conveying the target container. In specific implementation, a third sensor component may also be provided on the first container pickup mechanism. The first robot is configured to move to a container pickup position of the target container in response to the first conveying instruction, use the third sensor component to collect the target container size of the target container, adjust the container pickup size of the first container pickup mechanism based on the target container size to match the target container size, and use the adjusted first container pickup mechanism to acquire and convey the target container. For the position where the third sensor component is provided, referring to the position where the first sensor component is provided described below, as illustrated in FIG. 5A.

Figure 2:
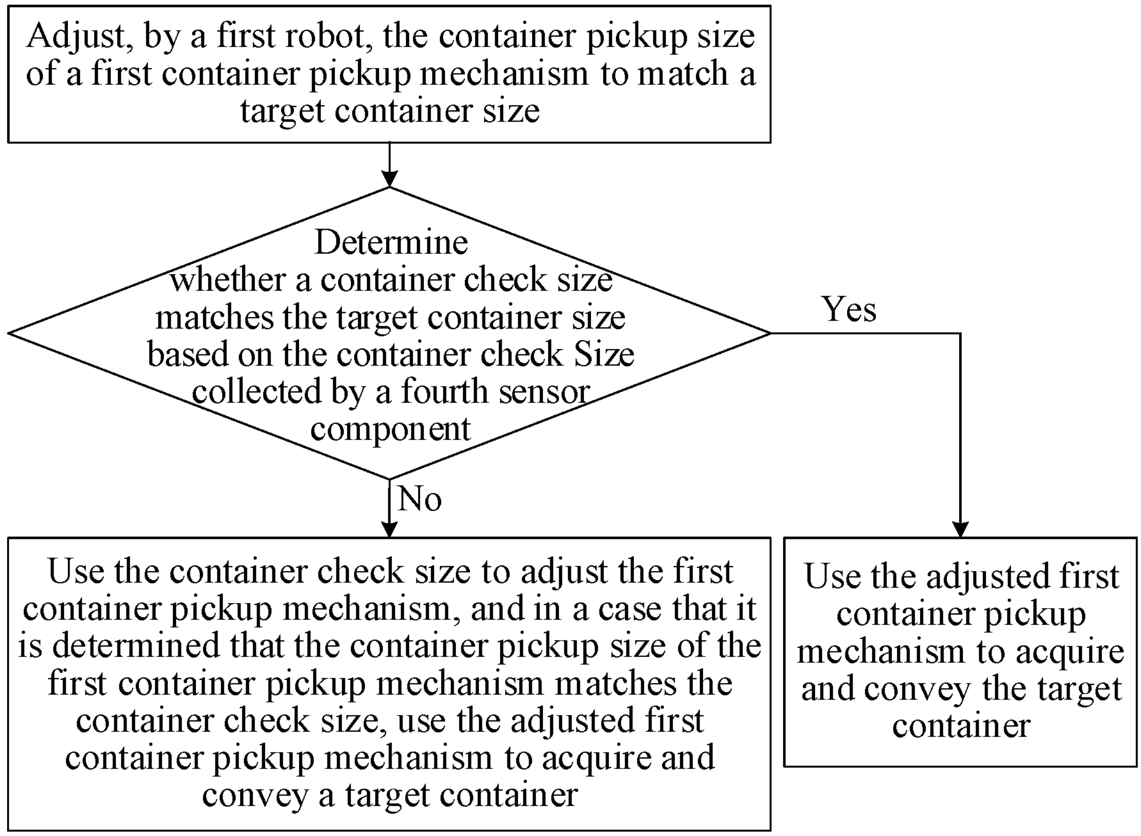
FIG. 2 illustrates a flowchart of conveying a target container by a first robot provided by the present disclosure.
Figure 5B:
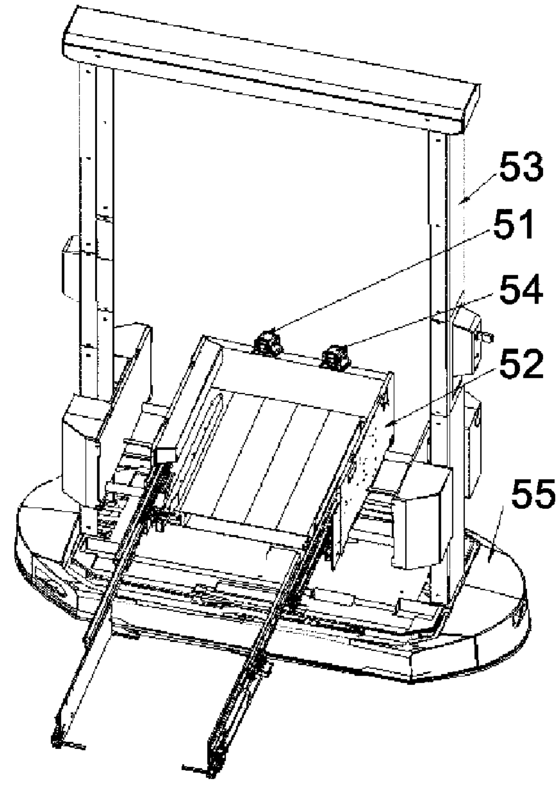
FIG. 5B illustrates a schematic structural diagram of a second robot provided with a second sensor component provided by the present disclosure.

Here, for the structure of the first container pickup mechanism, referring to the structure of the second container pickup mechanism described below, which will not be repeated here. Referring to FIG. 2, it illustrates a flowchart of conveying the target container by the first robot. In a possible embodiment, a fourth sensor component is further provided on the first robot. In a case that the target container size of the target container is known, the first robot may also use the actual container size of the target container collected by the fourth sensor component to check whether the target container size matches the actual container size. In specific implementation, after adjusting the container pickup size of the first container pickup mechanism to match the target container size, based on the container check size collected by the fourth sensor component, the first robot determines whether the container check size matches the target container size; in a case that the container check size matches the target container size, uses the adjusted first container pickup mechanism to acquire and convey the target container; and in a case that the container check size does not match the target container size, uses the container check size to adjust the first container pickup mechanism, and in a case that it is determined that the container pickup size of the first container pickup mechanism matches the container check size, uses the adjusted first container pickup mechanism to acquire and convey the target container. For the position where the fourth sensor component is provided, referring to the position where the second sensor component is provided described below, as illustrated in FIG. 5B.

The third sensor component and the fourth sensor component may be sensor components that can measure the distance, such as visual sensors or depth sensors. The specific sensor types are not specifically limited here.

In a possible embodiment, the first robot 103 is configured to move along a planned path indicated by the first running instruction in response to the first running instruction to the container pickup position to acquire and convey the target container.

Figures 3, 4:
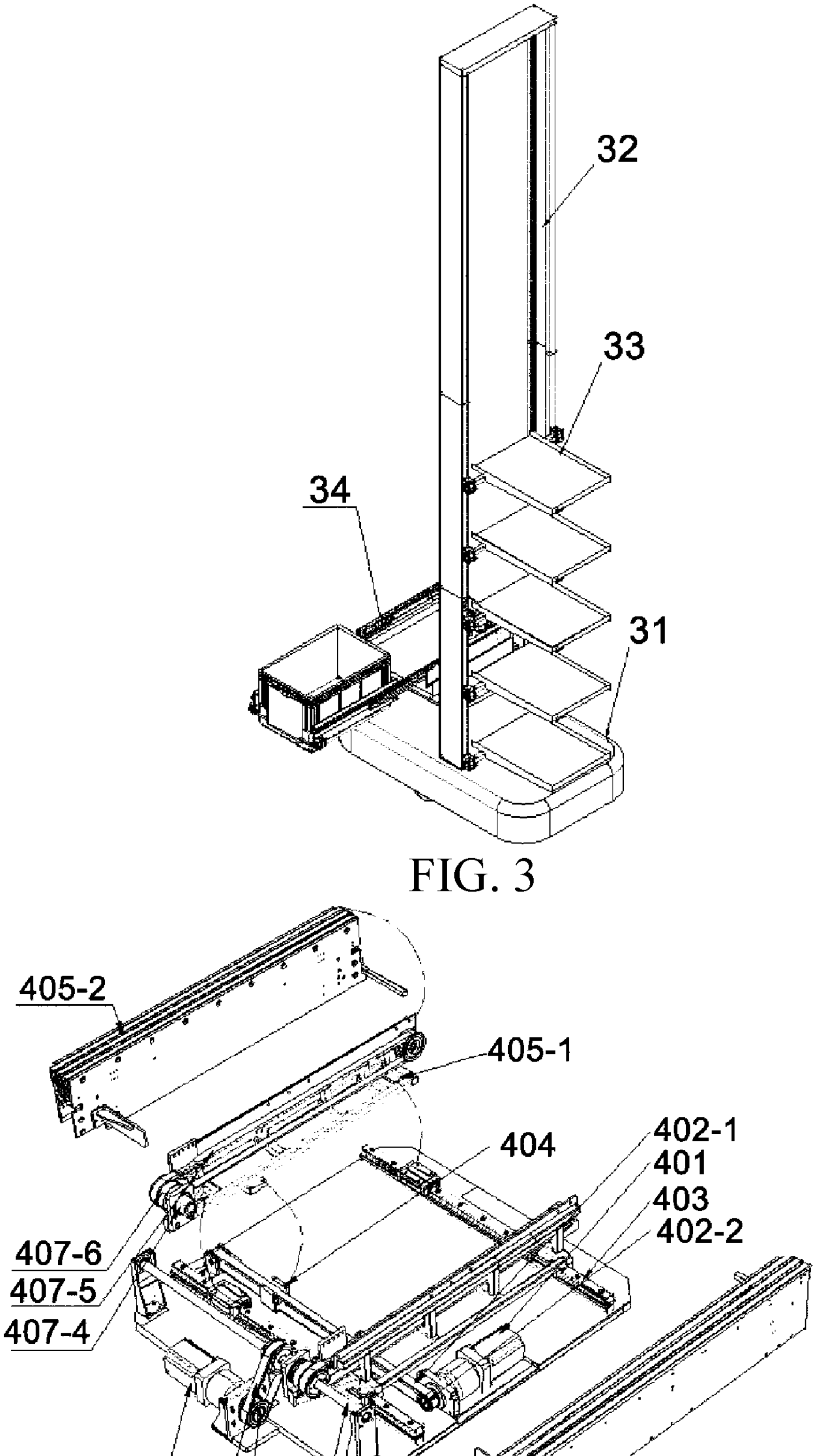
FIG. 3 illustrates a schematic structural diagram of a first robot provided by the present disclosure.
FIG. 4 illustrates a schematic structural diagram of a second container pickup mechanism provided by the present disclosure.

Referring to FIG. 3, it illustrates a schematic structural diagram of a first robot. The first robot includes a first robot body 31, a first lifting gantry 32 and a first temporary storage mechanism 33. The first container pickup mechanism is provided on the first lifting gantry 32. The first lifting gantry 32 is provided on a central axis of the first robot body. The first lifting gantry 32 includes a third guide rail. The first container pickup mechanism 34 is slidably connected with the third guide rail and is capable of sliding along the third guide rail. The first temporary storage mechanism 33 is provided on one side of the first lifting gantry 32 away from the first container pickup mechanism 34. After acquiring the target container, the first container pickup mechanism 34 places the target container on the first temporary storage mechanism 33.

The second robot 104 is configured to use the second container pickup mechanism to acquire and convey the target container in response to the second conveying instruction.

Here, in a case that the container pickup size of the second container pickup mechanism is not adjustable, the container pickup size of the second container pickup mechanism may be set to be greater than or equal to the third size threshold and less than the fourth size threshold. In this case, the second robot can acquire containers with container sizes greater than or equal to the third size threshold and less than the fourth size threshold.

In a possible embodiment, in a case that the container pickup size of the second container pickup mechanism is adjustable, the second robot 104 is configured to adjust the container pickup size of the second container pickup mechanism to match the target container size in response to the second conveying instruction, and use the adjusted second container pickup mechanism to acquire and convey the target container. Referring to FIG. 4, it illustrates a schematic diagram of a second container pickup mechanism.

Here, since the container pickup size of the second container pickup mechanism is adjustable, the second telescopic arm hooking mechanism provided on the second container pickup mechanism can be used to convey containers with any size within the first size range. The second container pickup mechanism includes a second telescopic arm hooking mechanism, a second adjustment mechanism and a first motor. The first motor is connected with the second adjustment mechanism. The second adjustment mechanism drives the second telescopic arm hooking mechanism to move along the moving direction of the second robot under the drive of the first motor 401 to adjust the container pickup size of the second container pickup mechanism.

Specifically, the second adjustment mechanism may include a first belt component and a first guide rail 403. The first belt component includes a first belt 402-1 and a first pulley 402-2. A driving block 404 is provided on the first belt 402-1. The second telescopic arm hooking mechanism is fixedly connected with the driving block 404. The second telescopic arm hooking mechanism includes a movable seat 405-1 and an insertion part 405-2. The insertion part 405-2 is provided on the movable seat 405-1. The movable seat 405-1 is slidably provided on the first guide rail 403. The first motor 401 is provided at one end of the first belt component. The first pulley 402-2 rotates under the drive of the first motor 401. The first belt 402-1 drives the second telescopic arm hooking mechanism to move under the drive of the first pulley 402-2 to adjust the container pickup size of the second container pickup mechanism.

In addition, a second motor 406 and a second belt component are further provided on the second container pickup mechanism. The insertion part 405-2 is fixedly connected with a third belt in the second belt component. The third belt in the second belt component is provided on the movable seat 405-1. The third belt in the second belt component drives the insertion part 405-2 to move under the drive of the second motor 406 to acquire the target container.

Specifically, the second belt component includes a second belt 407-1, a second pulley 407-2, a sliding key shaft 407-3, a sliding key nut 407-4, a third belt 407-5, and a third pulley 407-6. The second pulley 407-2 is connected with the second motor 406 and the sliding key shaft 407-3. The third pulley 407-6 is connected with the sliding key shaft 407-3 through the sliding key nut 407-4, and is fixedly mounted on the movable seat 405-1. The third belt 407-5 is fixedly connected with the insertion part 405-2. Under the drive of the second motor 406, the second belt 407-1 drives the sliding key shaft 407-3 to rotate, and the sliding key shaft 407-3 drives the third pulley 407-6 to rotate, thus driving the second telescopic arm hooking mechanism to retract to complete the task of acquiring the target container.

In another possible embodiment, the second adjustment mechanism may comprise a lead screw component. The lead screw component comprises a screw and a nut. The second telescopic arm hooking mechanism is provided on the nut. The screw is connected onto the nut in a sleeving manner. The first motor is provided at one end of the lead screw component. The screw rotates under the drive of the motor. The nut moves along the screw under the drive of the screw. The second telescopic arm hooking mechanism moves under the drive of the nut to adjust the container pickup size of the second container pickup mechanism.

In a possible embodiment, referring to FIG. **5*a* 5A, it illustrates a schematic structural diagram of a second robot provided with a first sensor component. In a case that the second conveying instruction does not provide the target container size of the target container to the second robot, the second robot may also detect the target container size of the target container through a first sensor component 51, and complete the task of acquiring and conveying the target container. In specific implementation, a first sensor component 51 may be provided on the second container pickup mechanism 52. The second robot is configured to move to a container pickup position of the target container in response to the second conveying instruction, use the first sensor component 51 to collect the target container size of the target container, adjust the container pickup size of the second container pickup mechanism 52 based on the target container size to match the target container size, and use the adjusted second container pickup mechanism 52** to acquire and convey the target container.

In a possible embodiment, referring to FIG. 5B, it illustrates a schematic structural diagram of a second robot provided with a second sensor component. A second sensor component 54 may be further provided on the second robot. In a case that the target container size of the target container is known, the second robot may also use the actual container size of the target container collected by the second sensor component 54 to check whether the target container size matches the actual container size. In specific implementation, after adjusting the container pickup size of the second container pickup mechanism 52 to match the target container size, based on the container check size collected by the second sensor component 54, the second robot determines whether the container check size matches the target container size; in a case that the container check size matches the target container size, uses the adjusted second container pickup mechanism 52 to acquire and convey the target container; and in a case that the container check size does not match the target container size, uses the container check size to adjust the second container pickup mechanism 52, and in a case that it is determined that the container pickup size of the second container pickup mechanism 52 matches the container check size, uses the adjusted second container pickup mechanism 52 to acquire and convey the target container.

The first sensor component and the second sensor component may be sensor components that can measure the distance, such as visual sensors or depth sensors. The specific sensor types are not specifically limited here.

In a possible embodiment, the second robot 104 is configured to move along a planned path indicated by the second running instruction in response to the second running instruction to the container pickup position to acquire and convey the target container.

Figures 5C, 6A:
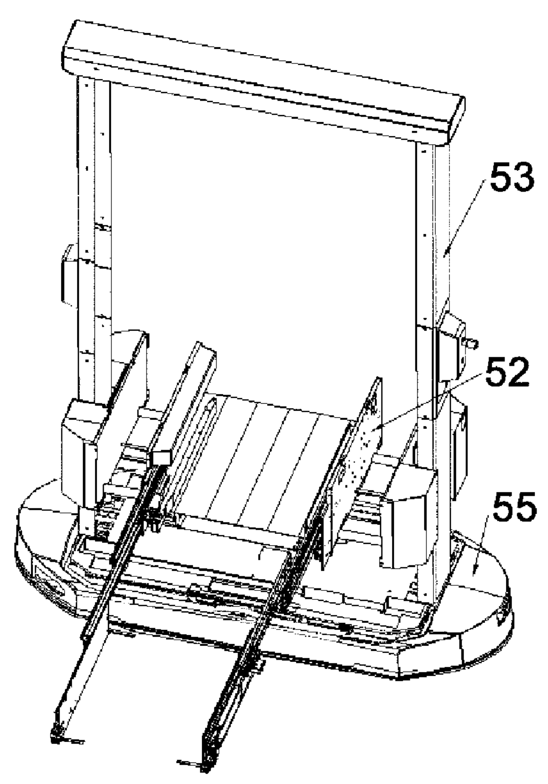
FIG. 5C illustrates a schematic structural diagram of a second robot provided by the present disclosure.
FIG. 6A illustrates a schematic three-dimensional structural diagram of a first robot in a use state provided by the present disclosure.

A telescopic direction of the second telescopic arm hooking mechanism is perpendicular to a moving direction of the second robot. Referring to FIG. 5C, it illustrates a schematic structural diagram of a second robot. The second container pickup mechanism is provided on a second lifting gantry 53. The second lifting gantry 53 is provided on a central axis of a second robot body 55. The second lifting gantry 53 comprises a second guide rail. The second container pickup mechanism 52 is slidably connected with the second guide rail. The second container pickup mechanism 52 is capable of sliding along the second guide rail under the drive of a synchronous belt transmission component, a chain transmission component, or a rack transmission component.

Here, the second robot may be further provided with a plurality of second temporary storage mechanisms. The second temporary storage mechanisms are provided on one side of the second lifting gantry away from the second container pickup mechanism. After acquiring the target container, the second container pickup mechanism places the target container on the second temporary storage mechanisms.

Through the system according to the present disclosure, it can be known that, in warehousing operation scenarios, by jointly using the first robot and the second robot for operation, containers with various container sizes can be picked up and placed, thus improving the utilization rate of a container storage space.

In a possible embodiment, at least one of the first robot and the second robot includes a chassis, a gantry, a lifting component, and at least two auxiliary supporting devices. The gantry in the first robot is a first lifting gantry. The first robot body includes a chassis. The gantry in the second robot is a second lifting gantry. The second robot body also includes a chassis.

Taking the first robot 103 as an example, referring to FIG. 6A, it illustrates a schematic three-dimensional structural diagram of a first robot in a use state provided by the present disclosure. The first robot 103 includes a first robot body 31, a first lifting gantry 32, a lifting component 35, and a first container pickup mechanism 34. The first robot body 31 includes a chassis 311. The chassis 311 may be specifically a main part of an AGV or other walking robots, which is provided with functional elements such as navigation system and walking system, including wheels, suspension and other components. As the carrying substrate of other components, the chassis 311 can enable the first robot to complete various movements such as walking and turning on the ground, so that the first robot can walk in a passageway between material racks 6.

Figures 6B, 7A:
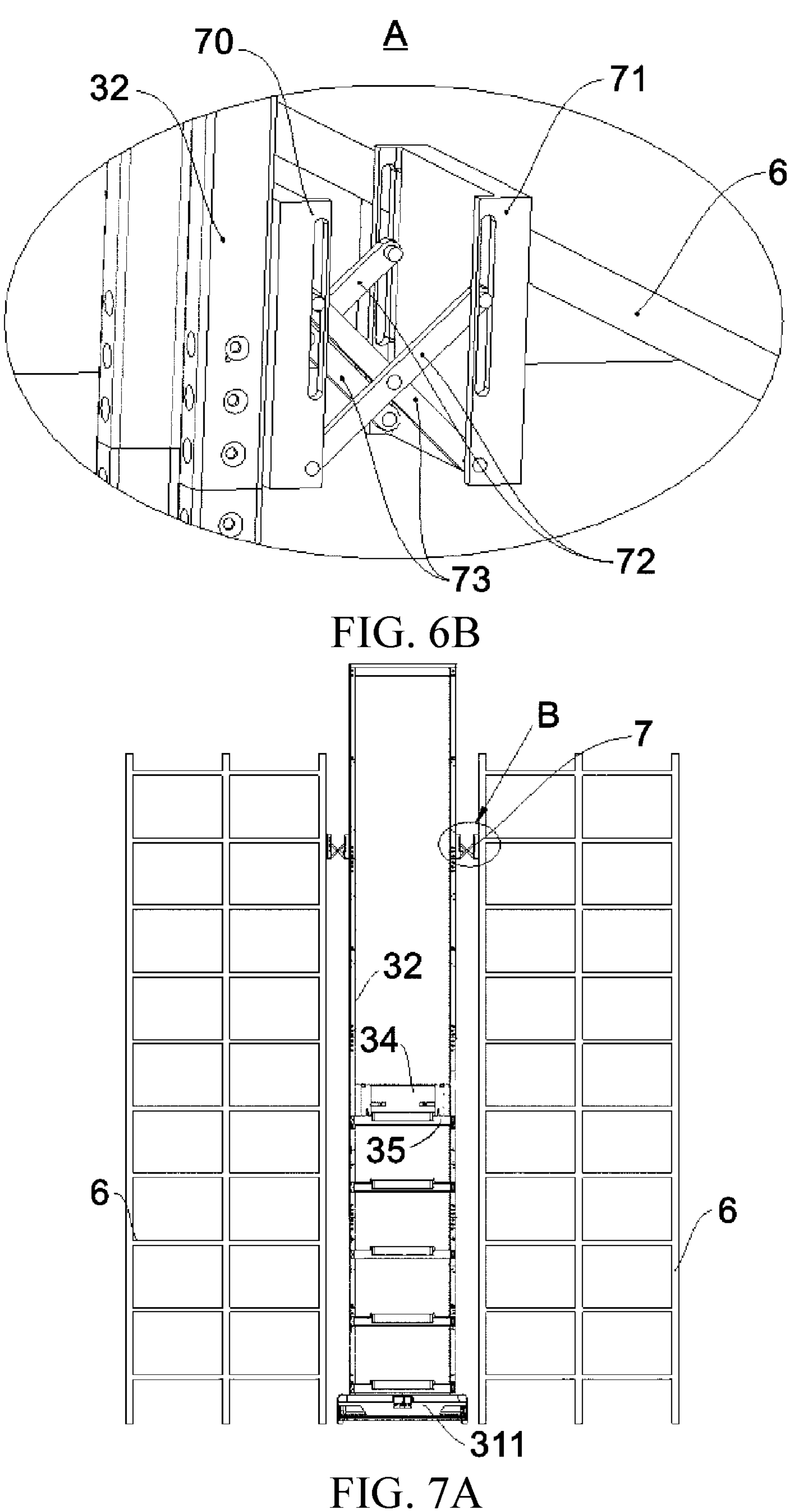
FIG. 6B illustrates a partial enlarged diagram of position A in FIG. 6A.
FIG. 7A illustrates a schematic front structural diagram of auxiliary supporting devices in an extended state in a structure illustrated in FIG. 6A.
Figures 7B, 8A:
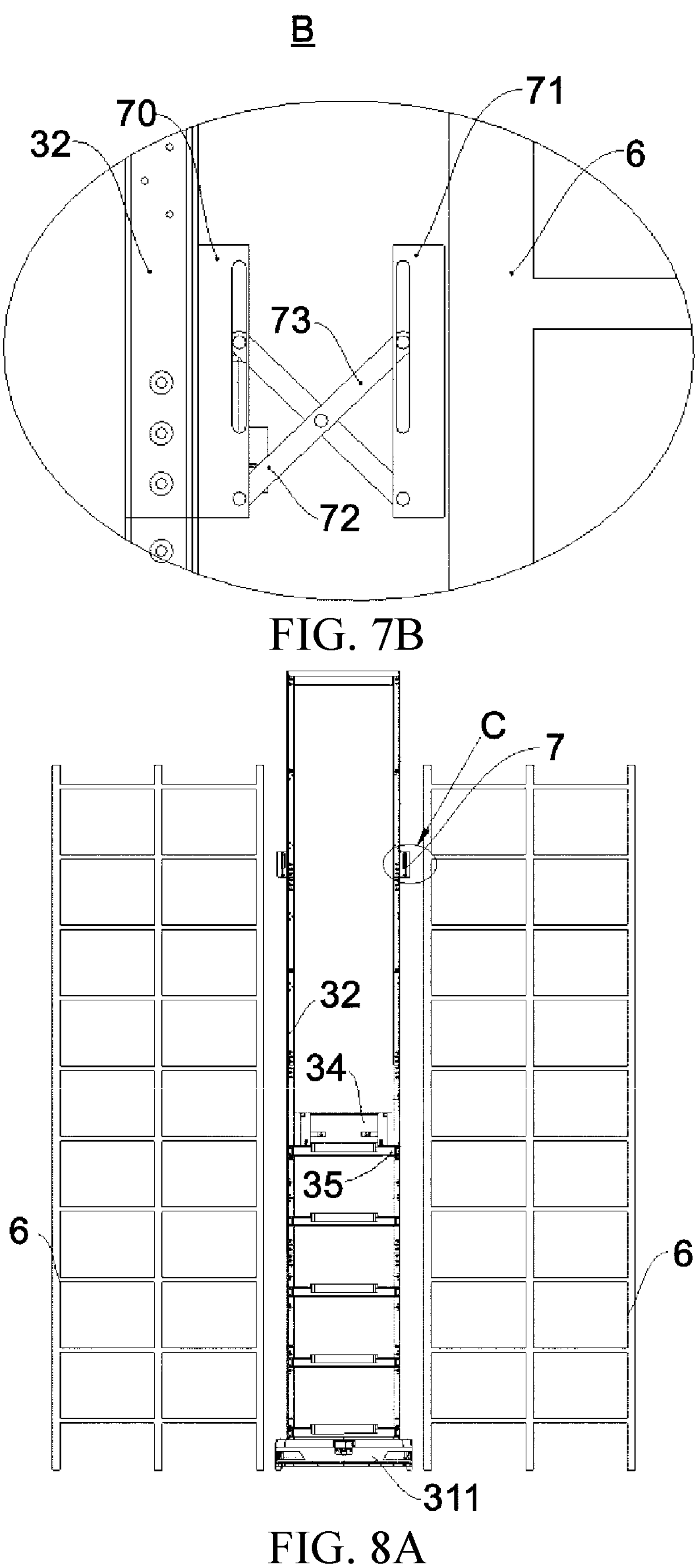
FIG. 7B illustrates a partial enlarged diagram of position B in FIG. 7A.
FIG. 8A illustrates a schematic front structural diagram of auxiliary supporting devices in a retracted state in a structure illustrated in FIG. 6A.
Figure 8B:
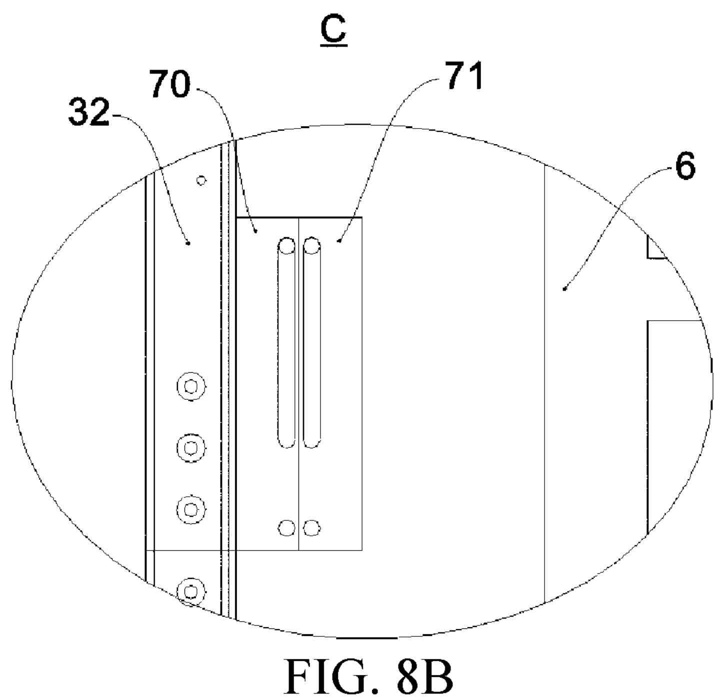
FIG. 8B illustrates a partial enlarged diagram of position C in FIG. 8A.

The lifting component 35 is mounted on the first lifting gantry 32 and can move along an extension direction of the first lifting gantry 32 under the driving force of its own driving element. The first container pickup mechanism 34 is connected with the lifting component 35. The first container pickup mechanism 34 can drive a holding fork to extend and retract through its own configured driving element to complete container storage and pickup actions at different shelf layers. In order to better understand the structure of the first robot, referring to FIG. 7A and FIG. 8A. FIG. 7A illustrates a schematic front structural diagram of auxiliary supporting devices in an extended state in a structure illustrated in FIG. 6A. FIG. 8A illustrates a schematic front structural diagram of auxiliary supporting devices in a retracted state in a structure illustrated in FIG. 6A.

Continuing to refer to FIG. 6A to FIG. 8A, two auxiliary supporting devices 7 are controlled by respective driving components, and are respectively provided on two opposite sides of the first lifting gantry 32. The two auxiliary supporting devices 7 are constructed to extend relative to the first lifting gantry 32 to abut against or separate from material racks 6 on the corresponding sides of the first lifting gantry 32. In order to better understand the specific structure and working principle of the auxiliary supporting devices 7, referring to FIG. 6B, FIG. 7A, FIG. 7B, FIG. 8A, and FIG. 8B. FIG. 6B illustrates a partial enlarged diagram of position A in FIG. 6A. FIG. 7B illustrates a partial enlarged diagram of position B in FIG. 7A. FIG. 8B illustrates a partial enlarged diagram of position C in FIG. 8A.

Figure 9:
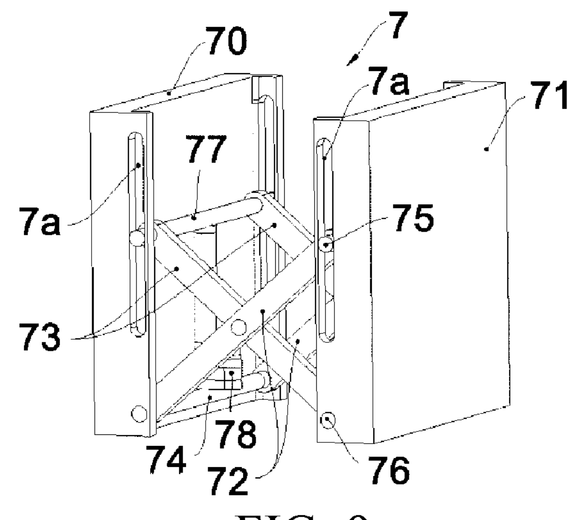
FIG. 9 illustrates a schematic three-dimensional structural diagram of auxiliary supporting devices illustrated in FIG. 6A.
Figure 10:
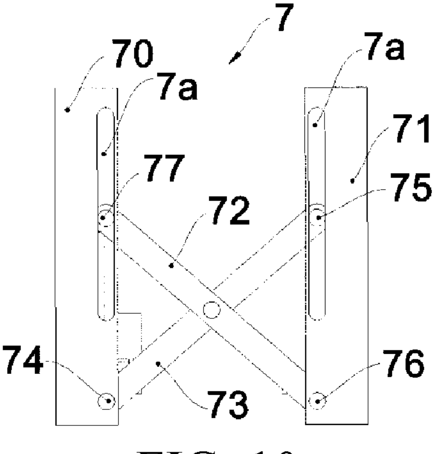
FIG. 10 illustrates a schematic front structural diagram of auxiliary supporting devices illustrated in FIG. 9.

In a possible embodiment, referring to FIG. 9, it illustrates a schematic three-dimensional structural diagram of auxiliary supporting devices 7 illustrated in FIG. 6A. In this embodiment, each auxiliary supporting device 7 comprises a fixed base 70 and a supporting element 71 connected onto the fixed base 70 in a retractable manner through a telescopic mechanism. The telescopic mechanism is controlled by a driving component 78 and constructed to drive the supporting element 71 to move relative to the fixed base 70 to abut against or separate from the material rack 6 on the corresponding side. In order to better understand the structure of the auxiliary supporting devices 7, referring to FIG. 10, it illustrates a schematic front structural diagram of auxiliary supporting devices 7 illustrated in FIG. 9.

The fixed base 70 is specifically a square plate, which is fixedly connected to a sidewall of the first lifting gantry 32 through threaded connection or bonding. The supporting element 71 has the same shape as the fixed base 70. The supporting element 71 is connected to the fixed base 70 in a retractable manner through a telescopic mechanism. Under the action of the driving component 78, the telescopic mechanism drives the supporting element 71 to move away from or close to the supporting element 71.

In this embodiment, the fixed base 70 is fixed on the first lifting gantry 32 and its fixed position may be located in a lower region, a middle region or an upper region along the extension direction of the first lifting gantry 32. Of course, the fixed base 70 may also be provided on the lifting component 35 or the first container pickup mechanism 34, so that it can reach any position in the extension direction of the first lifting gantry 32 along with the lifting component 35.

The telescopic mechanism includes a scissor fork unit. The scissor fork unit includes a first connecting rod mechanism and a second connecting rod mechanism provided in a crossing manner and hinged together at a crossing point. One end of the first connecting rod mechanism is hinged with the fixed base 70, and the other end is movably connected with the supporting element 71 in a slidable manner. One end of the second connecting rod mechanism is hinged with the supporting element 71, and the other end is movably connected with the fixed base 70 in a slidable manner.

In detail, the first connecting rod mechanism includes two first connecting rods 72 provided in parallel. The second connecting rod 73 mechanism includes two second connecting rods 73 provided in parallel. The same end of the two first connecting rods 72 is hinged on the same hinge shaft. The same end of the two second connecting rods 73 is hinged on the same hinge shaft. The first connecting rods 72 and the second connecting rods 73 on the same side cross each other and are hinged together.

In more detail, lower ends of the two first connecting rods 72 are both hinged on a first lower hinge shaft 74. Upper ends of the two connecting rods 72 are respectively hinged on two first upper hinge shafts 75 provided coaxially. These two first upper hinge shafts 75 are both movably connected to the supporting element 71 in a slidable manner. Two elongated holes 7*a* are provided in the supporting element 71. The two first upper hinge shafts 75 respectively run through the two elongated holes 7*a* and slide upwards and downwards along the elongated holes 7*a* relative to the supporting element 71.

Similarly, lower ends of the two second connecting rods 73 are respectively hinged on two second lower hinge shafts 76 provided coaxially. The two second lower hinge shafts 76 are fixedly or rotatably connected to the supporting element 71. Upper ends of the two second connecting rods 73 are both hinged on second upper hinge shafts 77. The second upper hinge shafts 77 are movably connected to the fixed base 70 in a slidable manner. Specifically, two elongated holes 7*a* are also provided in the fixed base 70. The second upper hinge shafts 77 run through the two elongated holes 7*a* and can slide along the elongated holes 7*a* under the action of an external force.

The driving component 78 that drives the telescopic mechanism includes a lead screw push rod motor. A casing of the lead screw push rod motor is fixedly connected to the fixed base 70, and a driving shaft thereof is fixedly connected to the second upper hinge shafts 77. By controlling the motor to rotate forwards or reversely, the driving shaft can drive the second upper hinge shafts 77 to slide upwards and downwards along the elongated holes 7*a*.

Specifically, when the lead screw push rod motor rotates forwards, the second upper hinge shafts 77 slide upwards along the elongated holes 7*a*. At this time, the first connecting rod mechanism and the second connecting rod mechanism of the scissor fork unit are retracted, causing the fixed base 70 and the supporting element 71 to gradually move close to each other. That is, the first robot is in a working state as a whole in FIG. 3. That is, the auxiliary supporting devices 7 are in a retracted state relative to the first lifting gantry 32. The supporting element 71 does not abut against the material rack 6 on the corresponding side, and the auxiliary supporting devices 7 do not have a supporting function at this time.

Contrarily, when the lead screw push rod motor rotates reversely, the second upper hinge shafts 77 slide downwards along the elongated holes 7*a*. At this time, the first connecting rod mechanism and the second connecting rod mechanism of the scissor fork unit are extended, causing the fixed base 70 and the supporting element 71 to gradually move away from each other. That is, the first robot is in a working state as a whole in FIG. 2. That is, the auxiliary supporting devices 7 are in an extended state relative to the first lifting gantry 32. The supporting element 71 extends to abut against the material rack 6 on the corresponding side, and the auxiliary supporting devices 7 support the first lifting gantry 32 by using the two material racks 6 on the two opposite sides at this time.

In a possible embodiment, the structure of the first robot is basically the same as the structure in the above embodiment. The main difference is that the specific structure of the auxiliary supporting devices 7 is different. For the sake of conciseness, the specific structure of the auxiliary supporting devices 7 in this embodiment will be described below in detail with reference to FIG. 11 to FIG. 14. The same part as the previous embodiment will not be repeated. In FIG. 11 to FIG. 14, except for the auxiliary supporting devices 7, the reference signs of other functional components are the same as those in the drawings (FIG. 6A to FIG. 10) of the embodiments above.

Figure 11:
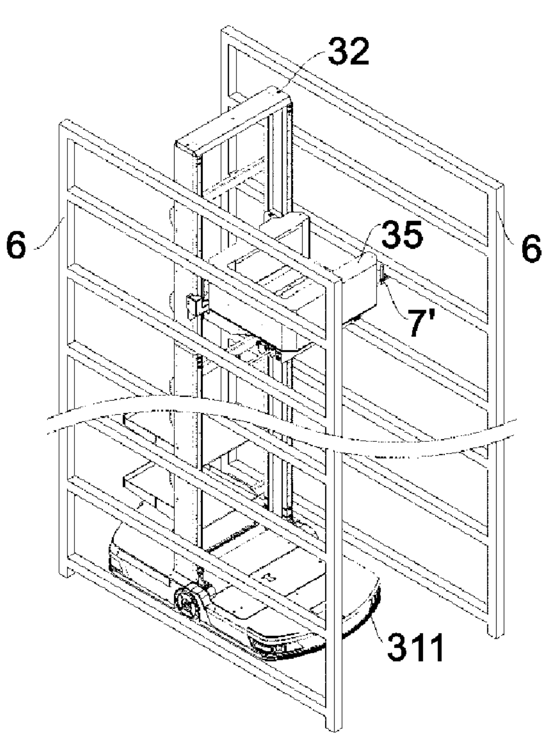
FIG. 11 illustrates a schematic three-dimensional structural diagram of a first robot in a use state provided by the present disclosure.
Figure 12:
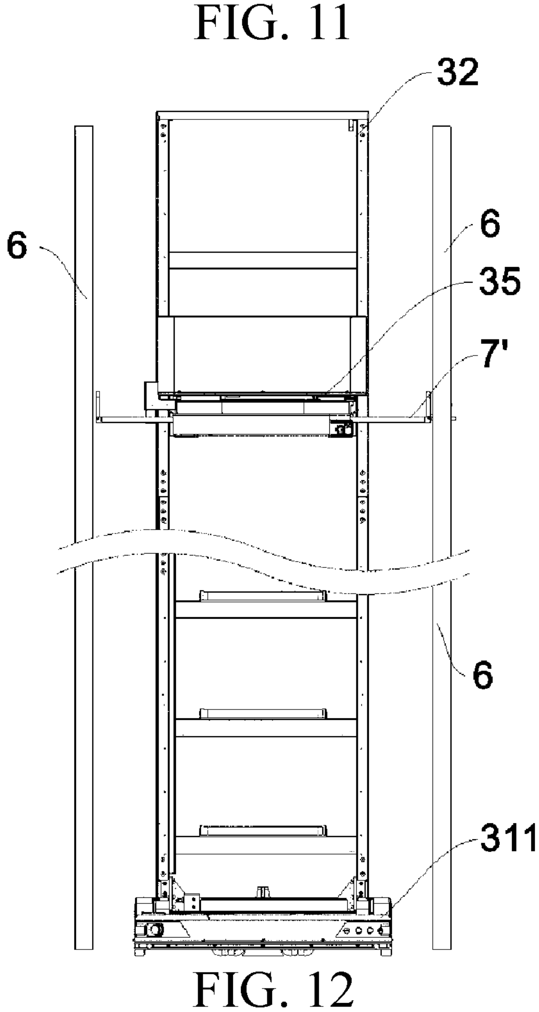
FIG. 12 illustrates a front diagram of a structure illustrated in FIG. 11.
Figure 13:
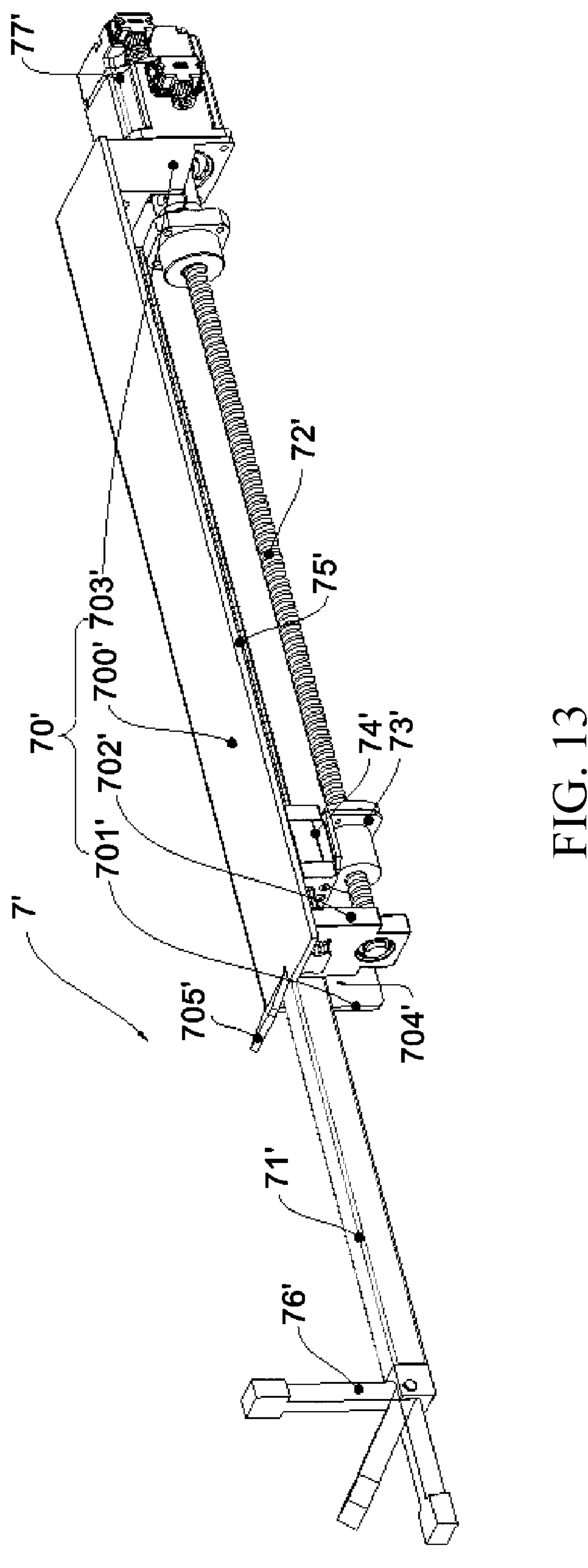
FIG. 13 illustrates a schematic three-dimensional structural diagram of auxiliary supporting devices illustrated in FIG. 11.

Referring to FIG. 11 to FIG. 13. FIG. 11 illustrates a schematic three-dimensional structural diagram of a first robot in a use state provided by the present disclosure. FIG. 12 illustrates a front diagram of a structure illustrated in FIG. 11. FIG. 13 illustrates a schematic three-dimensional structural diagram of auxiliary supporting devices 7 illustrated in FIG. 11.

Firstly, referring to FIG. 13, in this embodiment, each auxiliary supporting device 7 comprises a fixed base 70' and a supporting element 71' connected onto the fixed base 70' in a retractable manner through a telescopic mechanism. The telescopic mechanism is controlled by a driving component 77' and constructed to drive the supporting element 71' to move relative to the fixed base 70' to abut against or separate from the material rack 6 on the corresponding side.

The fixed base 70' includes a base plate 700' and a rear vertical plate 701', a left side plate 702' and a right side plate 703' fixedly connected to a lower surface of the base plate 700'. A guide groove 704' is formed between the rear vertical plate 701' and the left side plate 702'. The supporting element 71' is specifically a quadrangular rod. The supporting element 71' is driven through the telescopic mechanism under the action of the driving component 77' to extend out of the guide groove 704' or retract into the guide groove 704', thus achieving the purpose of enabling the supporting element 71' to move relative to the fixed base 70' to abut against or separate from the material rack 6 on the corresponding side.

In this embodiment, the base plate 700' of the fixed base 70' is fixed on a lower surface of the lifting component 35, so that the supporting element 71' in a retracted state is located within the width range of the first robot. In other embodiments, the base plate 700' may also be fixedly connected to a lower region, a middle region or an upper region of the first lifting gantry 32 along its extension direction, as long as the auxiliary supporting devices 7' in a retracted state are located within the width range of the first robot and can extend from the width direction of the first robot when extending. The width of the first robot refers to the size of the perpendicular distance between the two material racks it is located on.

Figure 14:
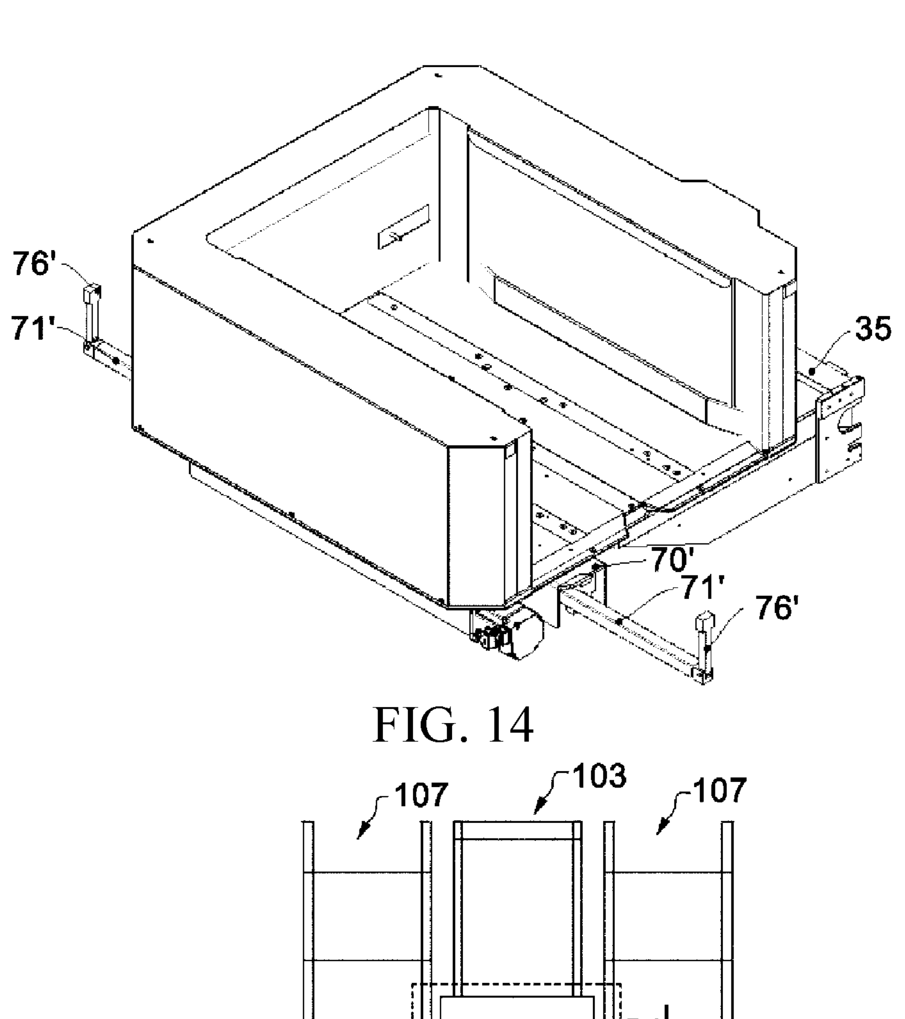
FIG. 14 illustrates a schematic three-dimensional structural diagram of an assembled body of auxiliary supporting devices illustrated in FIG. 11 and a lifting component.

In addition, in this embodiment, the auxiliary supporting devices 7' are connected to the lifting component 35, can move along the extension direction of the first lifting gantry 32 along with the lifting component 35, and can abut against the material racks 6 on the corresponding sides at any position of the first lifting gantry 32 to achieve a supporting function. The auxiliary function of the auxiliary supporting devices 7' is flexible, which can meet the supporting needs at different positions. In order to better understand the position and assembling relationship between the auxiliary supporting devices 7' and the lifting component 35, referring to FIG. 14. FIG. 14 illustrates a schematic three-dimensional structural diagram of an assembled body of auxiliary supporting devices illustrated in FIG. 11 and a lifting component.

Continuously referring to FIG. 13, the telescopic mechanism includes a lead screw nut transmission mechanism controlled by the driving component 77'. The lead screw nut transmission mechanism is constructed to drive the supporting element 71' to move relative to the fixed base 70' under the action of the driving component 77' to abut against or separate from the material rack 6' on the corresponding side.

In detail, a lead screw 72' of the lead screw nut transmission mechanism is rotatably connected to a left side plate 702' and a right side plate 703' of the fixed base 70' through structures such as bearings. A nut portion thereof includes a nut block 73' and a sliding block 74' that are fixedly connected to each other. The nut block 73' is located between the left side plate 702' and the right side plate 703' and is in threaded connection with the lead screw 72'. A sliding groove is provided in the sliding block 74'. A sliding rail 75' that extends along the axial direction of the lead screw 72' is fixedly connected to the base plate 700'. The sliding block 74' is slidably connected with the sliding rail 75' through the sliding groove, and the sliding block 74' is further fixedly connected with the supporting element 71'. Of course, the supporting element 71' may also be in guide fit with the base plate 700' through the guide rail component, and the nut block 73' in threaded connection with the lead screw 72' is directly connected with the supporting element 71'.

The driving component 77' includes a motor. A casing of the motor is fixedly connected to the right side plate 703'. An armature shaft of the motor is used for driving the rotation of the lead screw 72'. Controlling the rotation of the armature shaft of the motor can achieve the sliding of the nut block 73' relative to the lead screw 72' along the left or right direction, and then make the sliding block 74' to drive the supporting element 71' to extend out of the guide groove 704' of the fixed base 70' or retract into the guide groove 704' of the fixed base 70'.

In an embodiment of the present disclosure, in order to improve the stability of the auxiliary supporting devices 7' supporting the material racks 6, in this embodiment, a butting plate 76' is hinged at the end of the supporting element 71'. Specifically, a mounting groove is provided in the supporting element 71'. One end of the butting plate 76' is inserted into the mounting groove and hinged with the supporting element 71' through a hinge shaft. A butting surface of the butting plate 76' is in a T-shaped structure, and its vertical part is inserted into the mounting groove.

The butting plate 76' has a first position and a second position. In the first position, the butting plate 76' is folded and pre-compressed in the guide groove 704 'of the fixed base 70', and the butting plate 76' is consistent with the extension direction of the supporting element 71'. In the second position, the butting plate 76' is separated from the guide groove 704' of the fixed base 70', and the butting plate 76' rotates to a predetermined angle relative to the supporting element 71' under an elastic restoring force.

In an embodiment of the present disclosure, the butting plate 76' may be elastically connected with the supporting element 71' through a torsion spring, and in the second position, the butting plate 76' is at a 90° angle relative to the supporting element 71' under the elastic force of the torsion spring.

In order to simplify the overall structure of the auxiliary supporting devices 7', an inclined pressing plate 705' is further provided at an open end of the guide groove 704' on the fixed base 70'. The inclined pressing plate 705' is constructed to contact the butting plate 76' to push the contact plate 76' down when the supporting element 71' is retracted into the guide groove 704' of the fixed base 70'. The inclined pressing plate 705' extends outwards relative to the open end of the guide groove 704'.

The specific structure and working principle of the auxiliary supporting devices in the two embodiments are described above in detail with reference to the drawings. When the first robot reaches a passageway of two target material racks 6, if the container needs to be picked up and placed at a high level, the two auxiliary supporting devices are controlled to be extended to respectively abut against the two material racks 6 on the corresponding sides. Then, the lifting component 35 is controlled to drive the first container pickup mechanism 34 to reach the target position to pick up and place the container, which can prevent the first lifting gantry 32 from shaking. In this process, how to accurately control the extension distance of the supporting elements of the auxiliary supporting devices to ensure that the auxiliary supporting devices can precisely abut against the material racks 6 on the corresponding sides when extending is a technical problem that needs to be considered by those skilled in the art.

For this purpose, at least one of the first robots provided in the above embodiments further includes a distance detection sensor. The distance detection sensor is configured to detect the distance from the first robot to the material racks 6, and the two auxiliary supporting devices are configured to extend corresponding distances based on the distance detected by the distance detection sensor.

For example, the distance detection sensor is specifically a distance measuring element such as an infrared distance sensor. In some embodiments, distance detection sensors are provided on two sides of the first lifting gantry 32. These distance detection sensors detect the distance between each auxiliary supporting device and the material rack 6 on the corresponding side. The two auxiliary supporting devices extend corresponding distances according to the detected distances to the material racks 6 on the corresponding sides to exactly abut against the material racks 6.

In other embodiments, the distance detection sensor is provided on one side of the first lifting gantry 32, and is used for detecting the distance between the side of the first lifting gantry 32 and the material rack 6 on one side corresponding to the side, that is, detecting the distance between the side of the first lifting gantry 32 and the material rack 6 on one side corresponding to the side of the first lifting gantry 32. Moreover, the first robot further includes a computing unit configured to determine the distance between the other side of the first lifting gantry 32 and the material rack 6 on the corresponding side based on the distance between adjacent two material racks 6, the width of the first robot, and the distance detected by the distance detection sensor. In this embodiment, the distance between adjacent material racks and the width of the first robot are fixed values that can be pre-stored in a corresponding storage unit. The width of the first robot is a relative concept, which may be the width of the widest position of the first robot, the width of the gantry, or the width of other reference positions on the first robot, which will not be described specifically here.

In some other embodiments, the first robot further includes a detection unit and a control unit. The detection unit is configured to detect the current parameters of the driving components of the auxiliary supporting devices. The control unit receives the current parameters obtained by the detection unit. In a case that the current parameters exceed a threshold, the control unit sends an instruction of controlling the driving components to stop driving.

That is to say, the preset current threshold in the control unit is a current value that ensures the normal operation of the driving components (motors, etc.) of the auxiliary supporting devices when they are not subjected to external resistance. In a case that the actual current of a driving component is greater than the current value, it indicates that the driving component has been subjected to external force, that is, the auxiliary supporting device butts against the material rack 6 on the corresponding side. At this time, the driving component is controlled to stop driving.

In some other embodiments, the first robot includes a detection switch such as a proximity switch or a pressure switch. The detection switch is provided at a position in contact with the corresponding material rack 6 on the auxiliary device, such as the butting surface of the supporting element 71 in the former embodiment or the butting surface of the butting plate 76' in the latter embodiment. In addition, the detection switch is configured to be triggered when the auxiliary supporting device is extended to contact with the material rack 6 on the corresponding side, to transmit an electrical signal to control the driving component to stop driving.

In order to ensure that the auxiliary supporting devices can accurately abut against the material racks 6, the technical solutions of the embodiments may be solely or jointly used, which may be selected by those skilled in the art according to the actual needs and will not be repeated here.

In addition, in the embodiments above, the first robot includes two auxiliary supporting devices. These two auxiliary supporting devices are opposite in telescopic directions relative to the first lifting gantry 32, so that one butts against the material rack 6 on the right side of the first lifting gantry 32, and the other butts against the material rack 6 on the left side of the first lifting gantry 32. It is to understood that in other embodiments, the first robot may include more than two auxiliary supporting devices, that is, the number of the auxiliary supporting devices may be an integer greater than 2.

It is to be understood that the second robot of the present disclosure may also include at least two auxiliary supporting devices. For the specific structure of the second robot, referring to the description of the first robot above, which will not be repeated here.

In a possible embodiment, each of the first robot and the second robot includes a chassis and a gantry provided on the chassis. The first container pickup mechanism or the second container pickup mechanism is provided on the gantry in a liftable manner. Supporting mechanisms are provided on two opposite sides of the gantry.

The supporting mechanisms are configured to be triggered to be unfolded when the first container pickup mechanism or the second container pickup mechanism is raised to a set height, so that the supporting mechanisms on two sides of the gantry are supported on inventory receptacles on two sides of the robot (first robot or second robot). The gantry in the first robot is a first lifting gantry. The first robot body includes a chassis. The gantry in the second robot is a second lifting gantry. The second robot body also includes a chassis.

It is to be understood that in warehousing operation scenarios, the container to be conveyed is placed on the inventory receptacles 107, and a running passageway is located between two spaced inventory receptacles 107. Each inventory receptacle 107 includes a plurality of compartments 1071 provided at an interval along a vertical direction. A plurality of container storage spaces are provided at an interval along a length direction on each compartment 1071. Each container storage space can accommodate one container or several containers along a depth direction. One or more goods may be placed in each container. The specific structure of the inventory receptacle 107 may be set with reference to the existing technology. In addition, the number of the compartments 1071 in the inventory receptacle 107 and the height of each compartment 1071 may be set according to the demand. In the present disclosure, the inventory receptacles may be shelves, material racks or containers.

Description will be made below by taking the first robot 103 as an example.

Referring to FIG. 15 to FIG. 19, the first robot 103 includes a chassis 311, a first lifting gantry 32, a first container pickup mechanism 34, and supporting mechanisms 8. The chassis 311 has the function of autonomous movement. The first lifting gantry 32 is vertically provided on the chassis 311. The first container pickup mechanism 34 may be vertically and movably provided on the first lifting gantry 32 to pick up and place containers at different heights. The supporting mechanisms 8 are provided on two opposite sides of the first lifting gantry 32. The supporting mechanisms 8 are configured to be triggered to be unfolded when the first container pickup mechanism 34 is raised to a set height, so that the supporting mechanisms 8 on two sides of the first lifting gantry 32 are supported on the inventory receptacles 107 on two opposite sides of the first robot 103.

In the first robot 103 provided by this embodiment, by providing the supporting mechanisms 8 that can be triggered to be unfolded after the first container pickup mechanism 34 is raised to the set height, the first lifting gantry 32 can be auxiliary supported by the inventory receptacles 107 on two sides when the first container pickup mechanism 34 picks up and places high-level containers on the inventory receptacles 107, thus avoiding problems such as shaking of the first lifting gantry 32 and the first container pickup mechanism 34 caused by the center of gravity of the first container pickup mechanism 34 being raised, and improving the stability and safety of the first container pickup mechanism 34 when picking up and placing containers.

Each supporting mechanism 8 has an unfolded state in which the supporting mechanism is supported on the inventory receptacle 107 and a folded state in which the supporting mechanism is folded on the first lifting gantry 32. Exemplarily, the first container pickup mechanism 34 is capable of actuating the supporting mechanism 8 when lifted to the set height, so that the supporting mechanism 8 is switched between the folded state and the unfolded state. Such arrangement can avoid using a detection device to detect the position of the first container pickup mechanism 34 and avoid using a driving device to drive the supporting mechanism 8 to switch between the unfolded position and the folded position. The supporting mechanism 8 adopts a pure mechanical structure and the cost is low.

In other embodiments, the position of the first container pickup mechanism 34 may also be detected by a position detection device, and a driving device is provided to drive the supporting mechanism 8 to switch the state. The driving device is electrically connected with the position detection device to enable the driving device to control the operation of the supporting mechanism 8 based on the detection signal of the position detection device.

Figure 15:
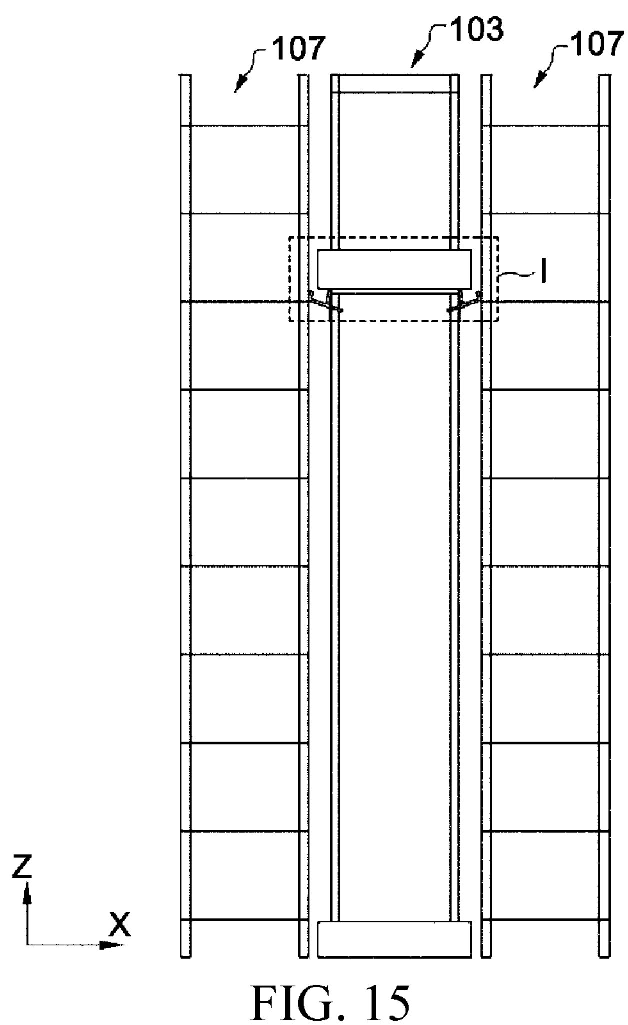
FIG. 15 illustrates a schematic structural diagram of a first robot and inventory receptacles when supporting mechanisms are unfolded provided by the present disclosure.
Figure 16:
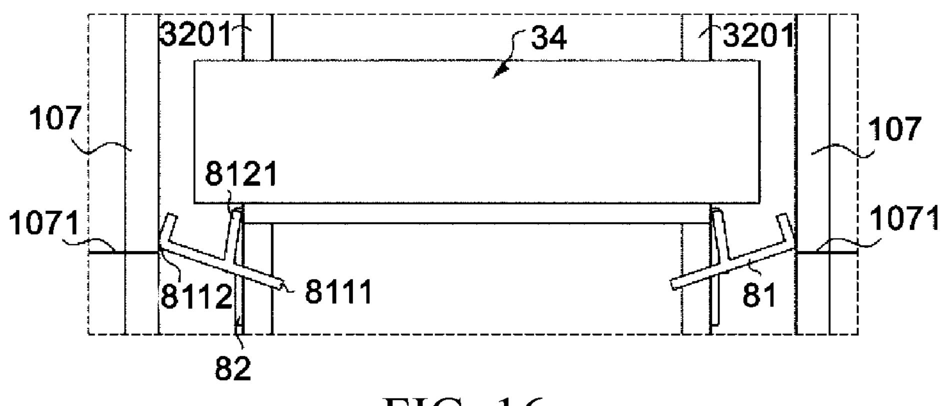
FIG. 16 illustrates a partial enlarged diagram of position I in FIG. 15.
Figure 17:
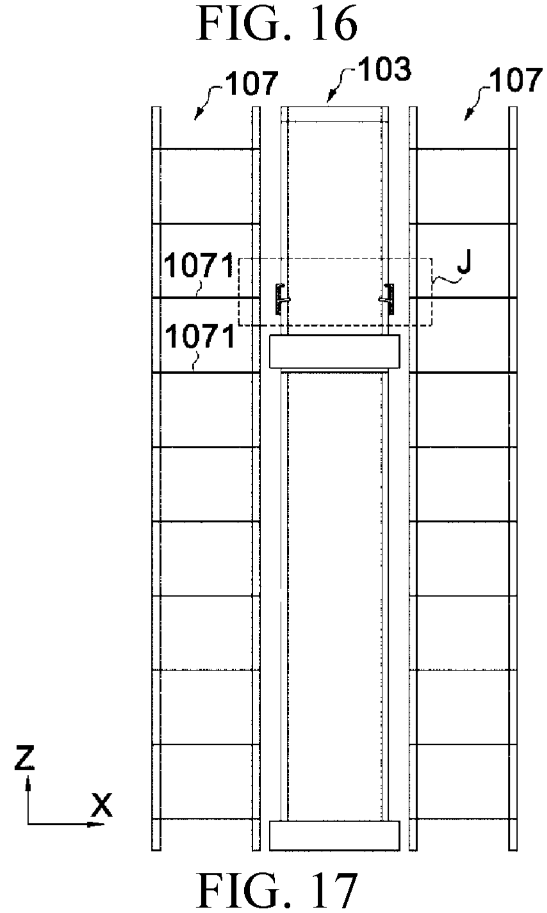
FIG. 17 illustrates a schematic structural diagram of a first robot and inventory receptacles when supporting mechanisms are folded provided by the present disclosure.
Figure 18:
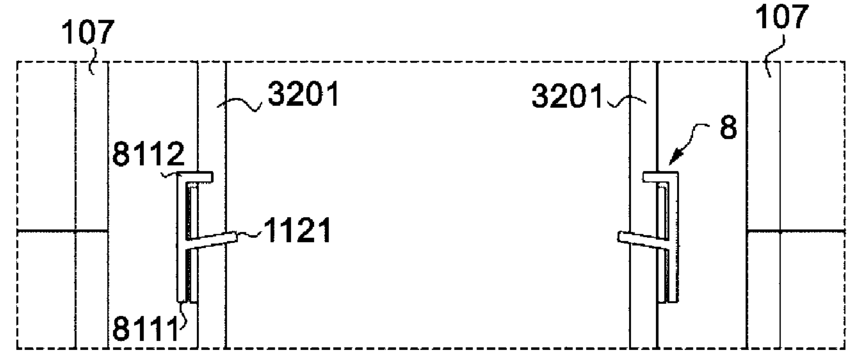
FIG. 18 illustrates a partial enlarged diagram of position J in FIG. 17.
Figures 19, 20:
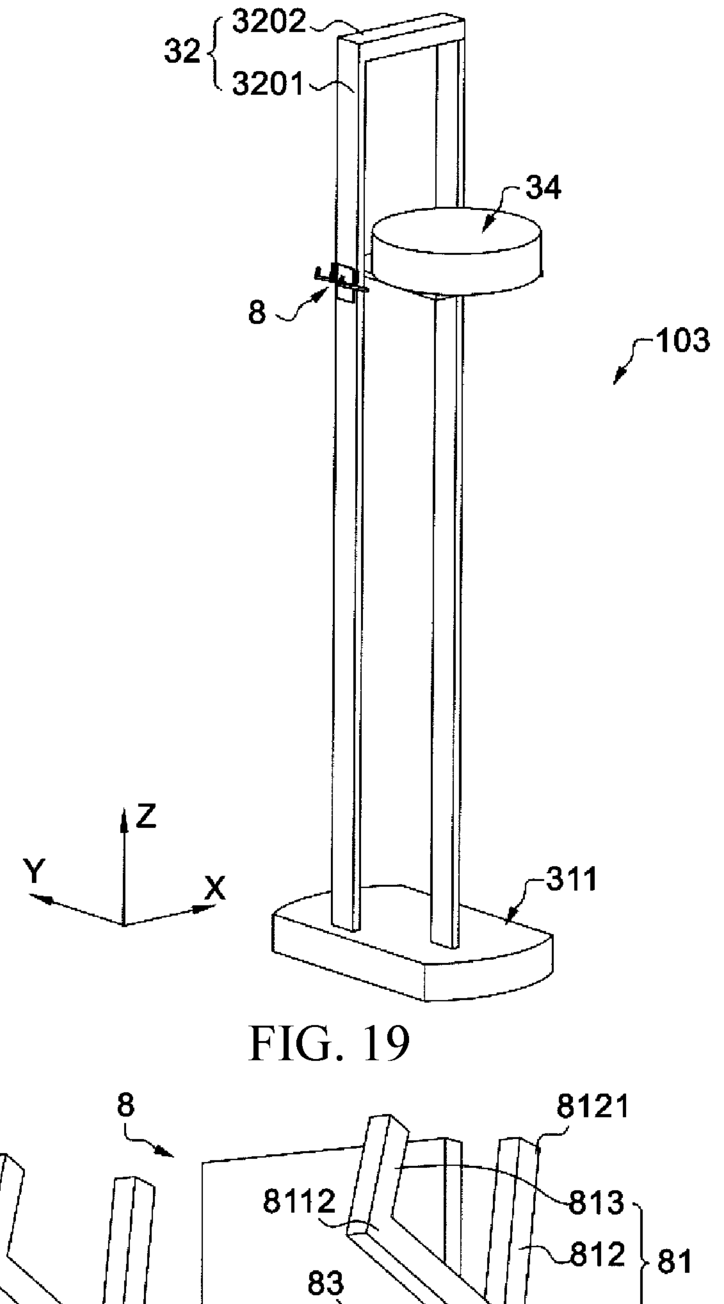
FIG. 19 illustrates a schematic structural diagram of a first robot provided by the present disclosure.
FIG. 20 illustrates a schematic structural diagram of supporting mechanisms in an unfolded state provided by the present disclosure.
Figures 21, 22, 23:
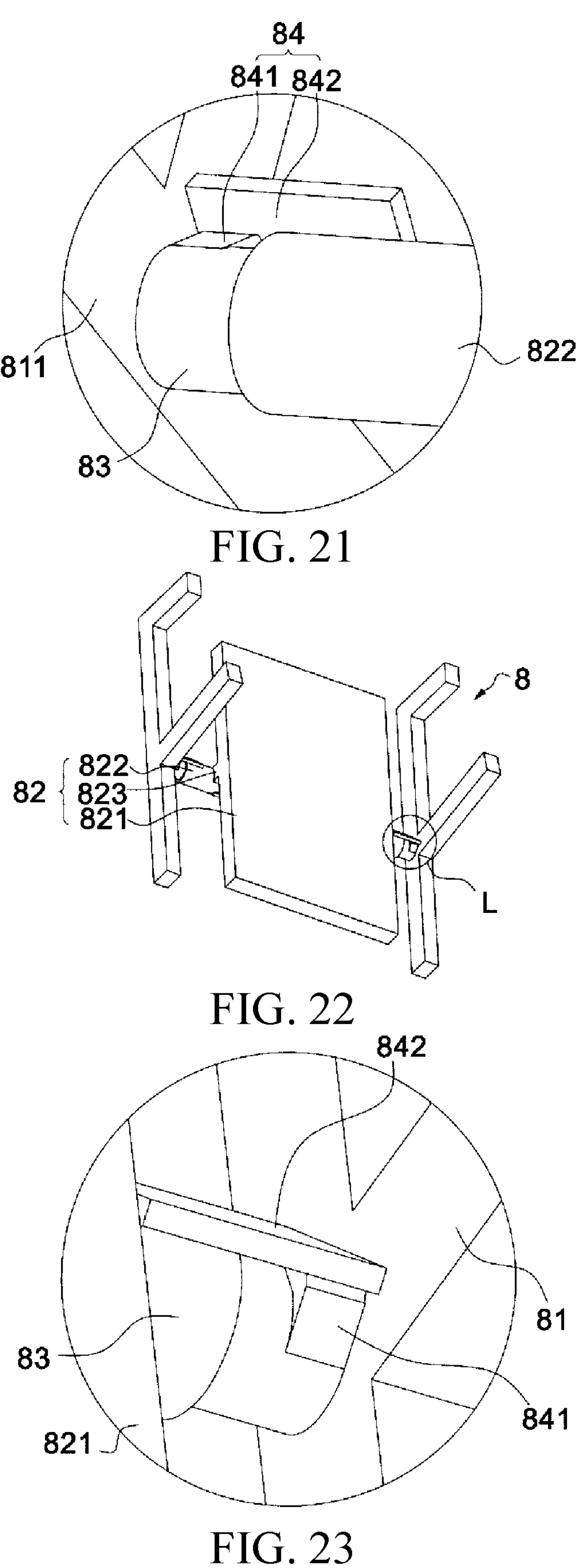
FIG. 21 illustrates a partial enlarged diagram of position K in FIG. 20.
FIG. 22 illustrates a schematic structural diagram of supporting mechanisms in a folded state provided by the present disclosure.
FIG. 23 illustrates a partial enlarged diagram of position L in FIG. 22.

For the convenience of description, an XYZ coordinate system is established in the direction illustrated in FIG. 19. Z direction is a vertical direction. XY plane is a horizontal plane. X direction is a first direction. Y direction is a second direction. X, Y and Z satisfy a right-hand coordinate rule. It is to be understood that the XYZ coordinate system illustrated in FIG. 15 is a local coordinate system of the first robot 103.

The chassis 311 includes a body and a driving wheel mechanism provided on the body. The driving wheel mechanism includes a driving wheel located at a bottom of the body and a driving unit located in the body and driving the driving wheel to rotate. The driving wheel mechanism may adopt, but not limited to, differential driving. A driving shaft of the driving wheel is provided along the X direction, that is, when the first robot 103 runs linearly, the first robot 103 runs along the Y direction. When the first robot 103 runs along the running passageway to a position between the two inventory receptacles 107 which are provided opposite to each other, the two inventory receptacles 107 are respectively located on opposite sides of the first robot 103 along the Y direction.

The first lifting gantry 32 includes columns 3201 which are provided opposite to each other at an interval along the X direction. The columns 3201 may adopt an integral structure or segmented structures connected along the Z direction. Exemplarily, a top beam 3202 is connected between top ends of two columns 3201 to enhance the structural strength of the first lifting gantry 32.

Exemplarily, a plurality of temporary storage partitions are provided at an interval along the height direction on the first lifting gantry 32. The first container pickup mechanism 34 temporarily stores the containers picked up from the inventory receptacles 107 onto the temporary storage partitions. Exemplarily, the height of several temporary storage partitions is lower than the set height to avoid the problem of poor stability caused by the high center of gravity of the first lifting gantry 32.

The first container pickup mechanism 34 is located between two columns 3201. The first container pickup mechanism 34 is connected with the first lifting gantry 32 through a lifting component 35. The first container pickup mechanism 34 includes a temporary storage tray, a telescopic fork component, a rotating component and a container pickup component. The temporary storage tray is connected with the first lifting gantry 32 and has a temporary storage space for temporarily storing a container. The telescopic fork component is horizontally retractable relative to the temporary storage tray to achieve the conveying of containers between the first robot 103 and the inventory receptacles 107. The container pickup component is used for picking up a container. The telescopic fork component is connected with the temporary storage tray through the rotating component to enable the telescopic fork component to rotate relative to the first lifting gantry 32, so as to change the telescopic direction of the telescopic fork.

That is, when the first robot 103 is in a moving state, the telescopic fork component extends along the Y direction. When the first robot 103 is located between two inventory receptacles 107, the telescopic fork component rotates to the X direction through the rotating component, and extends and retracts along the X direction to achieve the switching of the container between the temporary storage space and the inventory receptacles 107. When the container is transmitted between the temporary storage partition and the temporary storage space, the telescopic fork component extends and retracts along the Y direction.

For the structural arrangement of the chassis 311, the first lifting gantry 32, the lifting component 35, the first container pickup mechanism 34 and the temporary storage partitions, referring to the existing technologies, such as the arrangement in patent application CN202010524246.4. The structure of components except the supporting mechanism 8 is not specifically limited in the present disclosure.

The supporting mechanism 8 includes a supporting member 81. The supporting member 81 is rotatably connected with the column 3201 on the corresponding side of the first lifting gantry 32. The rotation axis of the supporting member 81 is set along the Y direction, thus reducing interference with the inventory receptacle 107 when the supporting member 81 rotates. The supporting member 81 has a supporting part 8112 that can be supported on the inventory receptacle 107. When the supporting member 81 is unfolded from the folded state to the unfolded state, the supporting part 8112 flips downwards along a direction away from the supporting mechanism 8 on the other side, thus better ensuring that the supporting part 8112 can be supported on the compartment 1071 of the inventory receptacle 107.

The supporting member 81 has an unfolding trigger part 8121 and a folding trigger part 8111. When the supporting mechanism 8 is in the folding state, the unfolding trigger part 8121 is located on an inner side of the first lifting gantry 32 and protrudes from an inner side surface of the column 3201. When the first container pickup mechanism 34 runs upwards to the set height, the first container pickup mechanism 34 pushes the unfolding trigger part 8121 upwards to drive the supporting member 81 to rotate from the folded state to the unfolded state. When the supporting mechanism 8 is in the unfolded state, the folding trigger part 8111 is located on the inner side of the first lifting gantry 32 and protrudes from an inner surface of the column 3201. When the first container pickup mechanism 34 runs downwards to the set height, the first container pickup mechanism 34 presses the folding trigger part 8111 downwards to enable the supporting member 81 to rotate from the unfolded state to the folded state.

In order to further improve the supporting stability of the supporting mechanism 8 in the unfolded state, a weight increasing structure is provided on the supporting part 8112. The weight increasing structure is used for increasing the weight of the supporting part 8112, so that when the supporting mechanism 8 is in the unfolded state, the center of the supporting part 81 shifts towards the side close to the inventory receptacle 107, so that the supporting part 8112 can be stably supported on the compartment 1071 of the inventory receptacle 107 under the action of gravity.

Referring to FIG. 20 to FIG. 23, in order to simplify the structure of the supporting member 81, the supporting member 81 is in an F-shaped structure, which includes a main supporting arm 811 that forms a vertical side of the F-shaped structure, and a shaft sleeve part 813 and a trigger arm 812 that form two horizontal sides of the F-shaped structure. The main supporting arm 811 is rotatably connected with the first lifting gantry 32. A first end of the main supporting arm 811 forms the folding trigger part 8111. A second end of the main supporting arm 811 is connected with the shaft sleeve part 813 and forms the supporting part 8112. The shaft sleeve part 813 forms the weight increasing structure. One end of the trigger arm 812 is connected with the main supporting arm 811. The other end of the trigger arm 812 forms the unfolding trigger part 8121. When the supporting mechanism 8 is in the folded position, the main supporting arm 811 is roughly vertically provided, both the shaft sleeve part 813 and the trigger arm 812 are located on one side of the main supporting arm 811 towards the supporting mechanism 8 on the other side, and the shaft sleeve part 813 is located above the trigger arm 812. The supporting member 81 is simple in structure and easy to manufacture.

It is to be understood that the structure of the supporting member 81 above is only an exemplary structure. In other embodiments, the supporting member 81 may also adopt other structural forms, such as plate structure or rod structure, as long as the arrangement of the unfolding trigger part 8121, the folding trigger part 8111 and the supporting part 8112 can be achieved.

Exemplarily, in order to reduce the vibration of the first robot 103, a shock-absorbing layer is provided on one side of the unfolding trigger part 8121 for contact with the first container pickup mechanism 34, one side of the folding trigger part 8111 for contact with the first container pickup mechanism 34, and/or one side of the supporting part 8112 for contact with the inventory receptacle 107 to reduce the vibration when the supporting element 1 is in contact with the first container pickup mechanism 34, and/or to reduce the vibration when the supporting element 1 is in contact with the inventory receptacle 107.

Exemplarily, the supporting member 81 is provided outside at least one side of the column 3201 along the Y direction, thus preventing the column 3201 from interfering with the rotation of the supporting member 81. In this embodiment, the supporting members 81 are provided on two opposite sides of the column 3201 along the Y direction to improve the supporting stability and reliability. Further, a rotating shaft 83 is connected between the two supporting members 81. The rotating shaft 83 is provided along the Y direction. The rotating shaft 83 may be integrally formed with the supporting component 81, or may be connected through welding, insertion and other connecting methods.

In order to improve the convenience of connection between the supporting mechanism 8 and the first lifting gantry 32, the supporting mechanism 8 further includes a mounting rack 82. The mounting rack 82 is detachably connected with the first lifting gantry 32. In addition, the mounting rack 82 is rotatably connected with the rotating shaft 83. The arrangement of the mounting rack 82 can reduce the reconstruction cost of the first lifting gantry 32, so that the first robot 103 can be better reconstructed based on the existing structure, thus achieving strong universality and simplifying the manufacturing of the first lifting gantry 32. In other embodiments, the column 3201 may also be provided with a shaft hole along the Y direction. The rotating shaft 83 is rotatably provided in the shaft hole. At least one of the two supporting members 81 is detachably connected with the rotating shaft 83.

The mounting rack 82 includes a mounting plate part 821 and a shaft sleeve part 822. The mounting plate part 821 is located on one side of the first lifting gantry 32 away from the supporting mechanism 8 on the other side. The mounting plate part 821 is detachably connected with the column 3201. The shaft sleeve part 822 is located on one side of the mounting plate part 821 away from the first lifting gantry 32. The rotating shaft 83 is rotatably provided in the shaft sleeve part 822. The structural arrangement of the mounting rack 82 can improve the convenience of connection between the mounting rack 82 and the first lifting gantry 32 and the rotating shaft 83. Moreover, since the mounting rack 82 is located on the outer side of the first lifting gantry 32, it can reduce the interference between the supporting mechanism 8 and the lifting component 35 and the first container pickup mechanism 34.

Further, the rotating shaft 83 and/or the shaft sleeve part 822 may be made of a wear-resistant material, or a wear-resistant sleeve may be provided between the rotating shaft 83 and the shaft sleeve part 822, so as to improve the wear resistance and service life of the supporting mechanism 8.

Exemplarily, a connecting part 823 is convexly provided on one side of the mounting plate part 821 away form the column 3201. The connecting part 823 extends along the Y direction. In addition, one side of the connecting part 823 away from the mounting plate part 821 is connected with the shaft sleeve part 822. The arrangement of the connecting part 823 is more conducive to achieving the connection between the shaft sleeve part 123 and the mounting plate part 821. The mounting plate part 821, the connecting part 823 and the shaft sleeve part 822 may be integrally formed, or the connecting part 823 may be integrally formed with the mounting plate part 821, and the shaft sleeve part 822 is connected with the connecting part 823 through welding.

Due to the use of a mechanical trigger method for state switching of the supporting member 81, in order to avoid the situation that the supporting member 81 has not yet rotated to the set position after the first container pickup mechanism 34 is out of contact with the unfolding trigger part 8121 or the folding trigger part 8111, the supporting mechanism 8 is further provided with an auxiliary actuating structure 84. The auxiliary actuating structure 84 is configured to drive the supporting member 81 to continuously rotate to the unfolded position after the first container pickup mechanism 34 is raised to be out of contact with the unfolding trigger part 8121, and drive the supporting member 81 to continuously rotate to the folded position after the first container pickup mechanism 34 is lowered to be out of contact with the folding trigger 8111.

In this embodiment, the auxiliary actuating structure 84 includes a cam 841 and a leaf spring 842. The cam 841 is connected to the rotating shaft 83. The leaf spring 842 is connected to the mounting rack 82. The cam 841 can compress the leaf spring 842 when it rotates with the rotating shaft 83, so that the leaf spring 842 can apply an elastic restoring force to the rotating shaft 83 through the cam 841 to enable the rotating shaft 83 to continuously rotate.

Exemplarily, the cam 841 is located at the end of the rotating shaft 83 and is exposed out of the shaft sleeve part 822. The leaf spring 842 is connected to the end of the shaft sleeve part 822 and is located on an outer side of the rotating shaft 83. The minimum distance between the leaf spring 842 and the rotating shaft 83 is greater than the maximum height of the cam 841 protruding from the outer surface of the rotating shaft 83. When the cam 841 presses against the leaf spring 842 to make it located at the closest position to the rotating shaft 83, the deformation of the leaf spring 842 is maximum, that is, the position where the distance between the leaf spring 842 and the rotating shaft 83 is minimum is the position where the deformation of the leaf spring 842 is maximum. When the first container pickup mechanism 34 is out of contact with the unfolding trigger part 8121 or the folding trigger part 8111, the cam 841 rotates to the maximum deformation position beyond the leaf spring 842.

Exemplarily, the leaf spring 842 is located on one side of the rotating shaft 83 towards the first lifting gantry 32, and the leaf spring 842 is inclined relative to the mounting plate part 821.

Exemplarily, the cam 841 is in a symmetrical water drop structure, with a large end connected with the rotating shaft 83 and a small end pressing against the leaf spring 842. The central axis of the rotating shaft 83 is located on the plane of symmetry of the cam 841. Further, the cam 841 is integrally formed with the rotating shaft 83.

The cam 841 is connected to the outer surface of the rotating shaft 83 and is located outside the shaft sleeve part 822. The leaf spring 842 is connected to the shaft sleeve part 822. The minimum distance between the leaf spring 842 and the rotating shaft 83 is less than the maximum height of the cam 841 protruding from the rotating shaft 83. The cam 841 can press against the leaf spring 842 during the rotation of the rotating shaft 83 to deform the leaf spring 842.

Exemplarily, the auxiliary actuating structure 84 is provided at each of two ends of the rotating shaft 83, so as to improve the actuating stability and reliability.

In other embodiments, the auxiliary actuating structure 84 may also be a torsion spring. One end of the torsion spring is connected with the supporting member 81. The other end of the torsion spring is connected with the mounting rack 82. In another embodiment, the auxiliary actuating structure 84 may be a magnetic attraction structure. For example, a first magnetic attraction member such as a magnet is provided on the rotating shaft 83. A second magnetic attraction member and a third magnetic attraction member such as metal plates are provided on the mounting rack 82 on upper and lower sides of the rotating shaft 83. By controlling the magnetic attraction force between the first magnetic attraction member and the second magnetic attraction member and designing the position of the first magnetic attraction member on the rotating shaft 83, it can achieve the effect that the magnetic attraction force between the first magnetic attraction member and the second magnetic attraction member is larger than the magnetic attraction force between the first magnetic attraction member and the third magnetic attraction member after the supporting member 81 rotates from the folded state to be out of contact with the first container pickup mechanism 34, and the magnetic attraction force between the first magnetic attraction member and the third magnetic attraction member is larger than the magnetic attraction force between the second magnetic attraction member and the first magnetic attraction member after the supporting member 81 rotates from the unfolded state to be out of contact with the first container pickup mechanism 34.

Further, in order to limit the rotation angle of the supporting member 81, a rotation limiting structure is further provided on the supporting mechanism 8. In this embodiment, a limiting opening 8221 is provided in a sidewall of the shaft sleeve part 822. Two sidewalls of the limiting opening 8221 along the circumferential direction of the shaft sleeve part 822 are a first limiting wall and a second limiting wall, respectively. A limiting protrusion 831 is convexly provided on the rotating shaft 83. The limiting protrusion 831 is movably provided in the limiting opening 8221. When the limiting protrusion 831 butts against the first limiting wall, the supporting mechanism 8 is in a first limit position. When the limiting protrusion 831 butts against the second limiting wall, the supporting mechanism 8 is in a second limit position. Exemplarily, the first limit position is a position when the supporting mechanism 8 is in the folded state, and the second limit position may be a position when the supporting mechanism 8 is in the unfolded state. However, it is to be understood that the second limit position may also be a position after continuous rotation away from the folded position from the unfolded position.

That is, in this embodiment, the rotation limiting structure includes a limiting opening 8221 and a limiting protrusion 831. In other embodiments, the rotation limiting structure may also be other existing structures that can achieve rotation limiting. For example, an arc-shaped limiting groove is provided in one side surface of the supporting member 81 towards the other supporting member 81, a limiting protrusion is convexly provided on the rotating shaft 83, and the limiting protrusion is slidably provided in the arc-shaped limiting groove. The rotation angle of the supporting member 81 is controlled by controlling a central angle corresponding to the arc-shaped limiting groove.

Exemplarily, the limiting port 8221 is an elongated opening extending along the length direction of the shaft sleeve part 822, and the limiting protrusion 831 is an elongated plate structure to improve the structural strength and limiting reliability.

Further, the mounting position of the supporting mechanism 8 relative to the first lifting gantry 32 is adjustable in the height direction, thus enabling the height of the supporting mechanism 8 to be adjustable, so that the supporting mechanism 8 can better adapt to the arrangement of different types of inventory receptacles 107 and the needs of inventory receptacles 107 at different heights. Structures that can adjust the connecting position of two structures in the height direction are relatively conventional. For example, a mounting hole extending along the vertical direction is provided in the mounting plate part 821, a threaded hole is provided in the column 3201, and the height of the supporting mechanism 8 is adjusted by adjusting the locking position of a threaded connector provided in the threaded hole and the mounting hole. The structures are not limited in this embodiment, which will not be repeated one by one.

In this embodiment, each column 3201 is provided with a supporting mechanism 8, which, however, is not limited in the present disclosure. Each column 3201 may also be provided with several supporting mechanisms 8 at an interval along the height direction. The supporting mechanisms 8 on the two columns 3201 are correspondingly provided one to one. Each pair of supporting mechanisms 8 corresponds to a set height.

It is to be understood that supporting mechanisms are also provided on two opposite sides of the second lifting gantry of the second robot. For the specific structure of the second robot, referring to the description of the first robot above, which will not be repeated here.

In an embodiment, the present disclosure provides a chassis 311 capable of adjusting pressure applied to the ground. Each of the first robot and the second robot of the present disclosure comprises a chassis. The chassis comprises a chassis body, first driving wheel components and an elastic adjustment component.

Description will be made below by taking the first robot as an example.

Figure 24:
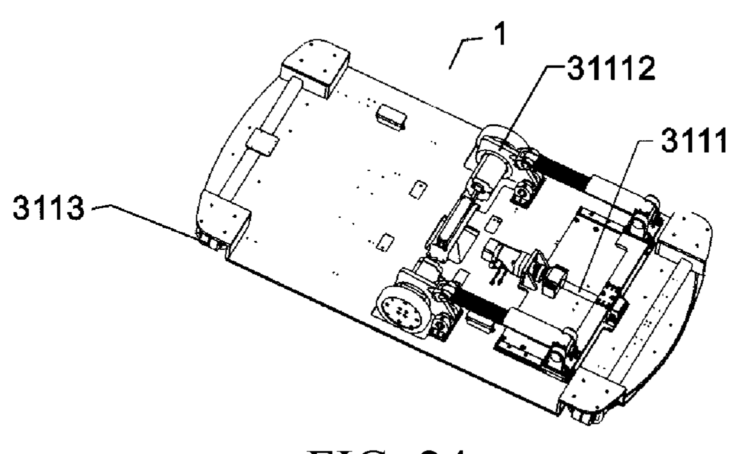
FIG. 24 illustrates a schematic structural diagram of a chassis provided by the present disclosure.

Referring to FIG. 24, FIG. 24 illustrates a schematic structural diagram of a chassis 311 provided by the present disclosure. The chassis 311 of the present disclosure includes a chassis body, first driving wheel components and fixed casters 3113. The first driving wheel components are used for driving the movement of the chassis body, while the fixed casters 3113 are used for assisting the first driving wheel components in supporting the chassis body. Exemplarily, the number of first driving wheel components is two. The two first driving wheel components are symmetrically provided on two sides of the middle of the chassis body. The number of the fixed casters 3113 is more than one. The more than one fixed casters 3113 are symmetrically provided at front and rear ends of the chassis body.

From the above structure, it can be seen that during movement, the chassis 311 ensures the grip of the chassis 311 by controlling the pressure applied to the ground by the first driving wheel components. For this purpose, the chassis 311 provided by the embodiment of the present disclosure further includes an elastic adjustment component 3111. The elastic adjustment component 3111 is used for changing the pressure applied by the first driving wheel components, so that the first driving wheel components can adjust the pressure applied to the ground by the driving wheels aiming at different application scenarios.

Figure 25:
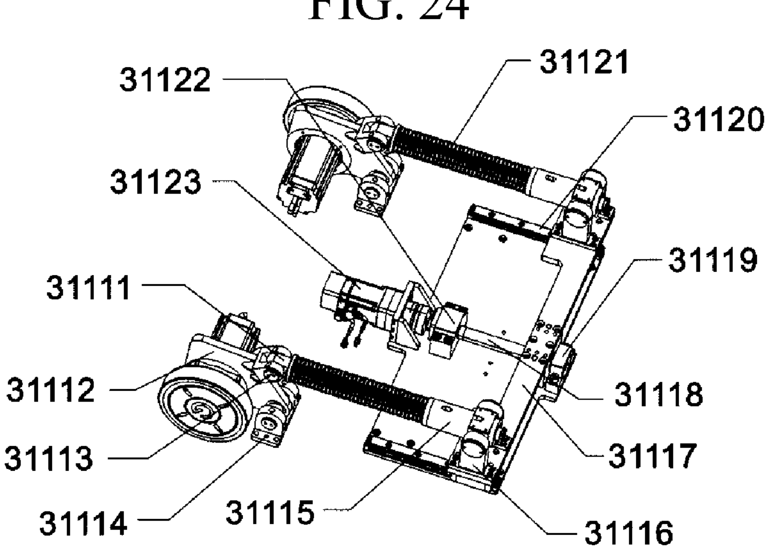
FIG. 25 illustrates a schematic structural diagram of driving wheel components and an elastic adjustment component provided by the present disclosure.

Referring to FIG. 25, FIG. 25 illustrates a schematic structural diagram of driving wheel components and an elastic adjustment component provided by the present disclosure. Firstly, the mode of connection between the first driving wheel components and the chassis body is described. The first driving wheel components are hinged with the chassis body and are capable of rotating relative to the chassis body; During specific connection, second hinge seats 31114 are provided on the chassis body. The first driving wheel components are hinged with the second hinge seats 31114 through pin shafts. Axes of the pin shafts are parallel to the ground, so that driving components 112 can change in the height direction when rotating around the pin shafts.

The second hinge seats 31114 are detachably connected with the chassis body, allowing for disassembling and maintenance in a case that the first driving wheel components fail. Exemplarily, the second hinge seats 31114 are fixedly connected with the chassis body through threaded connectors such as bolts or screws.

Each first driving wheel component includes an assembling plate (not shown) rotatably connected with the second hinge seat 31114, and a driving wheel fixedly mounted on the assembling plate. The driving wheel rotates with the assembling plate, thus changing the positive pressure applied by the driving wheel to the ground in the rotation process, so as to adapt to different loads and uneven ground conditions, and thus achieving better walking adaptability.

The elastic adjustment component 3111 includes shock-absorbing rod components and a driving mechanism. The shock-absorbing rod components are hinged with the first driving wheel components and used for providing a shock-absorbing effect for the first driving wheel components. In a case that the number of the first driving wheel components is two, the number of the corresponding shock-absorbing rod components is two. The two shock-absorbing rod components are correspondingly hinged with the two first driving wheel components one to one. The driving mechanism is used for adjusting the stroke of the shock-absorbing rod components to adjust the positive pressure applied by the first driving wheel components to the ground.

The driving mechanism includes a mounting plate 31117. The mounting plate 31117 is slidably assembled on the chassis body. The chassis body is provided with guide rails 31120. The extension direction of the guide rails 31120 is perpendicular to the arrangement direction of the two first driving wheel components. The mounting plate 31117 is slidably assembled on the guide rails 31120 and can slide back and forth in the direction towards and away from the first driving wheel components.

The number of the guide rails 31120 symmetrically provided may be two or more, so as to ensure the stable movement of the mounting plate 31117 along the guide rails 31120.

The shock-absorbing rod components are rod structures. First ends of the shock-absorbing rod components are hinged with the first driving wheel components. Second ends of the shock-absorbing rod components are hinged with the mounting plate 31117. In order to facilitate the description of the fitting of the shock-absorbing rod components respectively with the first driving wheel components and the mounting plate 31117, the structure of the shock-absorbing rod components will be firstly described below.

Each shock-absorbing rod component includes a mounting shaft 31111, a spring 31121 and a sliding sleeve 31115. The sliding sleeve 31115 is mounted on the mounting shaft 31111 in a sleeving manner and can slide relative to the mounting shaft 31111, so as to achieve the extension and retraction of the shock-absorbing rod component. The spring 31121 is mounted on the mounting shaft 31111 in a sleeving manner. One end of the spring 31121 presses against one end of the mounting shaft 31111 away from the sliding sleeve 31115, and the other end presses against the sliding sleeve 31115.

When the first end of the shock-absorbing rod component is hinged with the first driving wheel component, the mounting shaft 31111 is hinged with the first driving wheel component through a hinge pin shaft 31113, that is, the mounting shaft 31111 is hinged with an upper part of one end of the assembling plate of the first driving wheel component, so that a hinge point between the mounting shaft 31111 and the first driving wheel component is higher than a hinge point between the first driving wheel component and the second hinge seat 31114, and the driving wheel and the shock-absorbing rod component of the first driving wheel component are respectively located on two sides of a hinge point between the first driving wheel component and the second hinge seat 31114. When the extension and retraction amount of the shock-absorbing rod component changes, the first driving wheel component can be pushed to rotate relative to the hinge point between the first driving wheel component and the second hinge seat 31114. For example, in the process that the compression force of the spring 31121 increases when the sliding sleeve 31115 slides against the spring 31121, since the hinge point between the mounting shaft 31111 and the first driving wheel component is higher than the hinge point between the first driving wheel component and the second hinge seat 31114, the compression force of the spring 31121 drives the first driving wheel component to rotate downwards around the second hinge seat 31114, thus increasing the positive pressure applied to the ground by the driving wheel.

When the second end of the shock-absorbing rod component is hinged with the mounting plate 31117, first hinge seats 31116 are symmetrically provided on the mounting plate 31117. In a case that the number of the shock-absorbing rod components is two, the number of the corresponding first hinge seats 31116 is two, and the two first hinge seats 31116 are correspondingly hinged with the two shock-absorbing rod components one to one. The sliding sleeve 31115 of each shock-absorbing rod component is hinged with the corresponding first hinge seat 31116 through a pin shaft. In the sliding process of the mounting plate 31117 along the guide rails 31120, the sliding sleeve 31115 can be pushed to slide relative to the mounting shaft 31111 through the mounting plate 31117. Exemplarily, when the mounting plate 31117 slides towards the first driving wheel component, the spring 31121 is compressed, and the force applied by the spring 31121 to the first driving wheel component increases; when the mounting plate 31117 slides away from the first driving wheel component, the spring 31121 restores some elastic deformation and the pressure applied to the first driving wheel component decreases.

The driving mechanism further includes a driving device. The driving device is used for driving the mounting plate 31117 to slide. Exemplarily, the driving device is located between two shock-absorbing rod components to ensure that the two shock-absorbing rod components are evenly stressed when the driving device drives the mounting plate 31117 to slide.

When the driving device drives the mounting plate 31117 to slide relative to the chassis body, the driving device can lock the mounting plate 31117 at least in a first set position or second set position; when the mounting plate 31117 slides from the first set position to the second set position, the compression amount of the two springs 31121 increases. The first set position is far away from the first driving wheel components, and the second set position is close to the first driving wheel components. From the above description, it can be seen that when the mounting plate 31117 is close to the first driving wheel components, the springs 31121 are compressed, so that the force applied to the first driving wheel components increases.

As an optional solution, the driving device is a lead screw driving member. The lead screw driving member includes a first fixed seat 31119 and a second fixed seat 31122 fixedly provided on the chassis body. The mounting plate 31117 slides between the first fixed seat 31119 and the second fixed seat 31122, so as to limit the sliding distance of the mounting plate 31117 through the first fixed seat 31119 and the second fixed seat 31122. Exemplarily, when the mounting plate 31117 slides to the first set position, the mounting plate 31117 presses against the first fixed seat 31119; when the mounting plate 31117 slides to the second set position, the mounting plate 31117 presses against the second fixed seat 31122.

The lead screw driving member further includes a lead screw rod 31118 that passes through the first fixed seat 31119 and the second fixed seat 31122. The lead screw rod 31118 can rotate relative to the first fixed seat 31119 and the second fixed seat 31122. The lead screw rod 31118 runs through the mounting plate 31117 and is in threaded connection with the mounting plate 31117. In the rotation process of the lead screw rod 31118, the lead screw rod 31118 can drive the mounting plate 31117 to slide along the length direction of the lead screw rod 31118 through thread fitting.

The lead screw driving member further includes a driving motor 31123. The driving motor 31123 is fixedly assembled on the chassis body. One end of the lead screw rod 31118 away from the first fixed seat 31119 is connected with an output shaft of the driving motor 31123. The driving motor 31123 can drive the lead screw rod 31118 to rotate during working. The mounting plate 31117 slides along the length direction of the lead screw rod 31118, and drives the sliding sleeves 31115 on two sides to slide relative to the mounting shafts 31111 in the sliding process.

It is to be understood that in addition to the lead screw driving member in the above embodiment, the driving device may also be any one of driving devices such as an electric push rod or a cylinder fixed provided on the chassis body. A driving end of the electric push rod or the cylinder is fixedly connected with the mounting plate 31117. Alternatively, the driving device may also be any one of driving devices that move linearly.

From the above description, it can be seen that the driving mechanism drives the shock-absorbing rod components to change the pressure applied by the first driving wheel components, so that the first driving wheel components hinged on the chassis body rotate correspondingly and the positive pressure applied on the ground by the driving wheel changes, thus making the chassis 3111 applicable to various scenarios and greatly enhancing the stability of the entire machine. Moreover, in case of a failure, the positive pressure applied to the ground by the driving wheel is adjusted down, so that the robot can be manually pushed away for maintenance.

It is to be understood that the second robot of the present disclosure also includes a chassis. For the specific structure of the second robot, referring to the description of the first robot above, which will not be repeated here.

In another embodiment, each of the first robot and the second robot provided by the embodiment of the present disclosure comprises a chassis. The chassis comprises a chassis component and a supporting platform. The chassis component comprises two hinged chassis bodies, second driving wheel components provided on one chassis body, and universal wheel components connected with each chassis body through cushion components. The supporting platform is respectively connected with the two chassis bodies through an adjustment component.

Description will be made below by taking the first robot as an example. Firstly, referring to FIG. 26, the main structure of the chassis 311 of the first robot provided by the embodiment of the present disclosure includes two parts, i.e., a chassis component and a supporting platform 40. The chassis component serves as a walking component of the chassis 311. When the chassis 311 is used, the chassis component is used for contacting the ground and driving the first robot 103 to move. The supporting platform 40 serves as a carrying part of the chassis 311, which is mainly used for carrying other devices of the robot or containers, such as the gantry of the robot.

Figure 26:
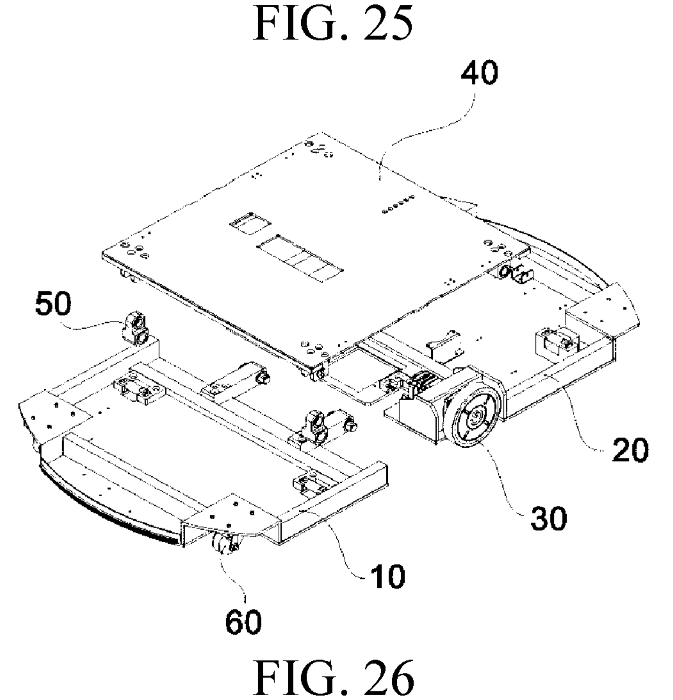
FIG. 26 illustrates an exploded diagram of a chassis provided by the present disclosure.

The chassis component mainly includes two hinged chassis bodies, which are named as a first chassis 10 and a second chassis 20 for convenience of description. When the first chassis 10 and the second chassis 20 are hinged, the first chassis 10 and the second chassis 20 can rotate relative to each other during walking of the robot, thus improving the adaptability of the chassis component. One of the first chassis 10 and the second chassis 20 is provided with second driving wheel components. FIG. 26 illustrates an example that the second driving wheel components 30 are provided on the first chassis 10. However, it is to be understood that the arrangement of the second driving wheel components 30 is not limited in the present disclosure. The second driving wheel components 30 may be provided on either the first chassis 10 illustrated in FIG. 26 or the second chassis 20, as long as it is located at a hinge position between the first chassis 10 and the second chassis 20.

In addition, universal wheel components 60 are provided on each chassis. Each chassis is supported through the universal wheel components 60 and the second driving wheel components 30. Taking the first chassis 10 as an example, one end of the first chassis 10 is provided with second driving wheel components 30, and the opposite end is provided with universal wheel components 60. The first chassis 10 can be supported through the second driving wheel components 30 and the universal wheel components 60.

Figures 27, 28, 29:
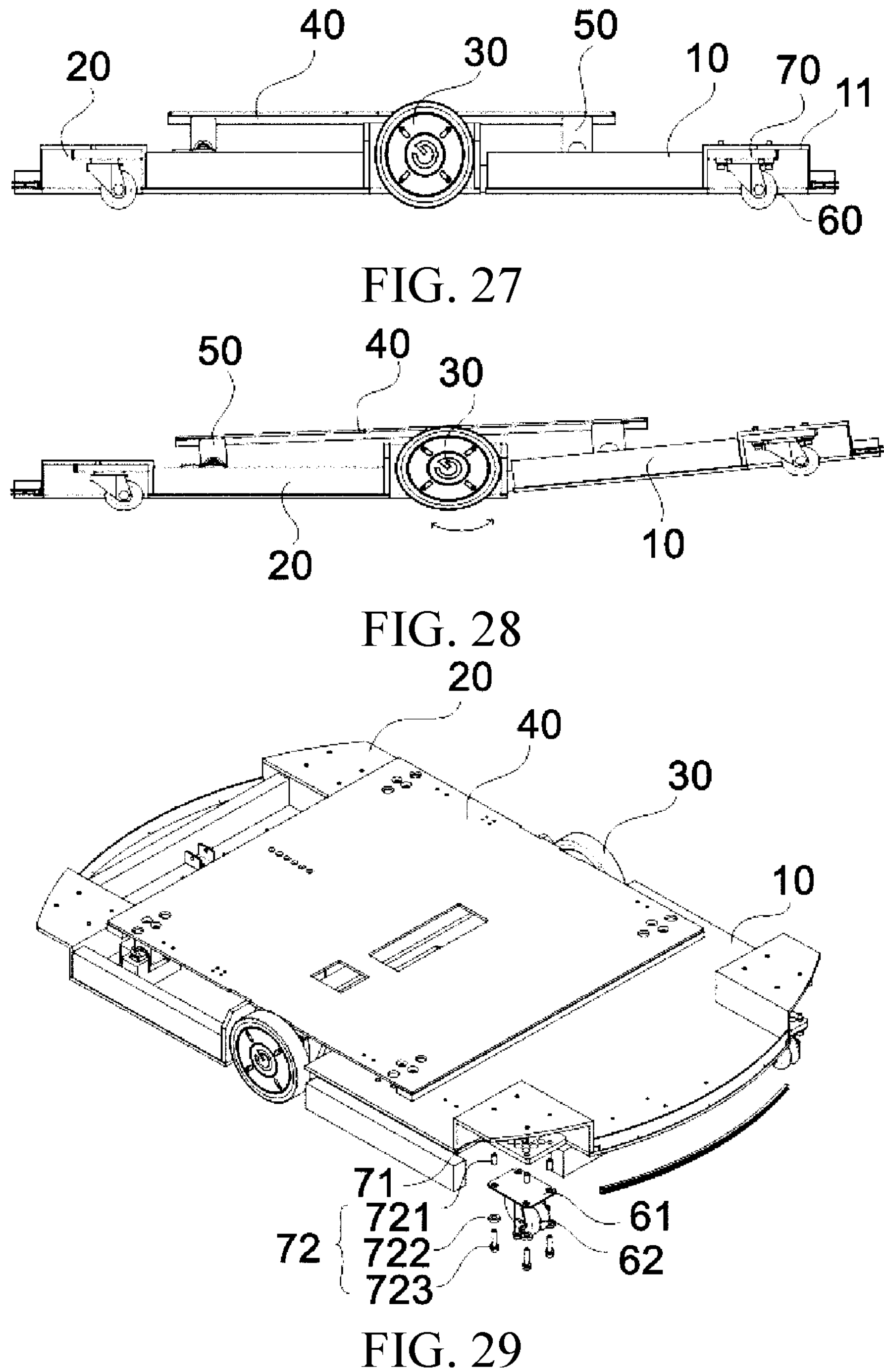
FIG. 27 illustrates a side diagram of a chassis provided by the present disclosure.
FIG. 28 illustrates a schematic diagram of a chassis when crossing an obstacle provided by the present disclosure.
FIG. 29 illustrates an exploded diagram of a universal wheel component and a cushion component provided by the present disclosure.

In order to facilitate the arrangement of the universal wheel components 60, recessed areas 11 for accommodating the universal wheel components 60 are provided on each chassis. Referring to FIG. 27, each corner of the first chassis 10 is provided with a recessed area 11 for accommodating the universal wheel component 60. The recessed area 11 is formed by bending the first chassis 10. Therefore, the height of the first chassis 10 is reduced, thus lowering the center of gravity of the first chassis 10 and improving the stability during walking.

Similarly, the second chassis 20 also adopts the same supporting method as the first chassis 10, which will not be repeated here.

The supporting platform 40 is a plate structure, which is respectively connected with the first chassis 10 and the second chassis 20 through an adjustment component 50. Exemplarily, the adjustment component 50 may be a connecting rod component. The supporting platform 40 is respectively hinged with the first chassis 10 and the second chassis 20 through the connecting rod component. The connecting rod component includes a first connecting rod and a second connecting rod. Two ends of the first connecting rod are respectively hinged with the supporting platform 40 and the first chassis 10. One end of the second connecting rod is fixedly connected with the second chassis 20, and the other end is hinged with the supporting platform 40. Alternatively, one end of the second connecting rod is hinged with the second chassis 20, and the other end is fixedly connected with the supporting platform 40. The hinging axis of the hinged structure is parallel to the hinging axis of the first chassis 10 and the second chassis 20.

The number of first connecting rod and the second connecting rods is not specifically limited in the present disclosure. The number of the first connecting rods may be two, three, etc. The number of the second upright rods may be one, two, three, etc. However, it is to be understood that in a case that number of the first connecting rods or the second connecting rods is more than one, the more than one first connecting rods are provided in a single row, and the arrangement direction is parallel to the hinging axis of the first chassis 10 and the second chassis 20. Similarly, the second connecting rods are provided in the same way.

Referring to FIG. 28, the first chassis 10 and the second chassis 20 illustrated in FIG. 28 can rotate relative to each other through the hinging position (as illustrated by a double arrow), so that the second driving wheel components 30 and the universal wheel components are in contact with the ground. In addition, the supporting platform 40 transfers the weight of the carried items to the first chassis 10 and the second chassis 20 through the adjustment component 50, thus changing the stress on the chassis 311, allowing the chassis to better adapt to the ground and reducing the situation that the chassis 311 tilts or is overloaded. In addition, the adjustment component 50 adopts a multi-connecting-rod design (first connecting rod and second connecting rod) to enhance the obstacle crossing ability of chassis 311. When the chassis 311 crosses an obstacle, through the adjustment of the adjustment component 50, the shaking angle of the supporting platform 40 is enabled to be half or approximately half of the obstacle crossing angle of the chassis 311. At the same time, the adjustment component 50 enables the force applied by the supporting platform 40 to respectively act on the first chassis 10 and the second chassis 20, so that the positive pressure applied by the second driving wheel components 30 to the ground is large, thus improving the grip effect of the chassis 311.

Referring to FIG. 26 and FIG. 27, in a case that the first chassis 10 and the second chassis 20 are hinged, in order to ensure that the first chassis 10 and the second chassis 20 adapt to the ground, during the arrangement of the universal wheel components 60, each chassis is provided with two universal wheel components 60, and the two universal wheel components 60 are located at the two corners of the corresponding chassis.

In this case, each chassis is supported by four wheels (two driving wheels and two universal wheels). In order to ensure the stability of each chassis, during the arrangement of the universal wheel components 60, the universal wheel components 60 are connected with each chassis through cushion components 70. The cushion components 70 can provide a cushioning effect to the universal wheel components 60 in the vertical direction, thus enabling the universal wheel components 60 to slide along the vertical direction.

Referring to FIG. 29, FIG. 29 illustrates an exploded diagram of a universal wheel component 60 and a cushion component 70. The cushion component 70 includes a cushion pad 71 and a connecting component 72. The cushion pad 71 is a part of the cushion component 70 that plays a cushioning effect. The connecting component 72 serves as a fixed connecting structure for connecting the universal wheel component 60 with the corresponding chassis. Description will be made below by taking the first chassis 10 and the corresponding cushion pad 71 and universal wheel component 60 as an example.

The connecting component 72 is used for connecting the universal wheel component 60 with the first chassis 10. During assembling, the connecting component 72 is fixedly connected with the first chassis 10, and the universal wheel component 60 is slidably assembled on the connecting component 72 and can slide along the vertical direction. The cushion pad 71 is mounted on the connecting component 72 in a sleeving manner and is located between the universal wheel component 60 and the corresponding chassis. When the universal wheel component 60 slides along the vertical direction, elastic force can be provided through the cushion pad 71 to ensure its contact effect with the ground.

As an optional solution, the connecting component 72 includes a bolt 723 and a sleeve 721 mounted on the bolt 723 in a sleeving manner. The two ends of the sleeve 721 respectively press against the chassis and a nut of the bolt 723. The universal wheel component 60 is mounted on the sleeve 721 in a sleeving manner and can slide along the length direction of the sleeve 721. During assembling, firstly the sleeve 721 is mounted on a screw of the bolt 723 in a sleeving manner, and then the screw is enabled to pass through the universal wheel component 60 and is tightened onto the first chassis 10. At this time, the two ends of the sleeve 721 respectively press against the first chassis 10 and the nut of the bolt 723. The universal wheel component 60 is mounted the sleeve 721 in a sleeving manner and can slide along the length direction (vertical direction) of the sleeve 721, thus preventing the universal wheel component 60 from being influenced by the thread on the screw during sliding.

As an optional solution, in order to improve the cushioning effect of the connecting component 72, during the arrangement of the connecting component 72, the connecting component 72 further includes a washer 722 mounted on the screw of the bolt 723 in a sleeving manner. The washer 722 is located between the nut and the universal wheel component 60. When the universal wheel component 60 is assembled, the washer 722 and the cushion pad 71 are respectively provided on two sides of the universal wheel component 60, so as to avoid hard collision between the universal wheel component 60 and the nut, thus improving the safety of the universal wheel component 60.

Exemplarily, both the cushion pad 71 and the washer 722 may be made of a polyurethane material, the cushion pad 71 is a polyurethane pad and the washer 722 is a polyurethane washer, thus ensuring a good elastic effect of the cushion pad 71 and the washer 722.

In addition, in order to improve the cushioning effect of the cushion pad 71, during the arrangement of the cushion pad 71, a plurality of hollowed-out structures may be provided on the cushion pad 71. The plurality of hollowed-out structures may be structures such as hollowed-out holes or hollowed-out grids, so that the cushion pad 71 has better elasticity.

As an example, the universal wheel component 60 may include a supporting plate 61 and a universal wheel 62 rotatably connected with the supporting plate 61. During assembling, the cushion pad 71 is located between the supporting plate 61 and the corresponding chassis, the supporting plate 61 is mounted on the sleeve 721 in a sleeving manner, and the cushion pad 71 and the washer 722 are respectively provided on two opposite sides of the supporting plate 61, so as to improve the cushioning effect of the universal wheel component 60.

In order to ensure the stability of the connection between the universal wheel component 60 and the first chassis 10, four connecting components 72 may be used for connecting the universal wheel components 60 with the first chassis 10. Of course, three, five, six and other different number of connecting components 72 may also be used, which is not specifically limited in the embodiment of the present disclosure.

From the above description, it can be seen that in the embodiment of the present application, two universal wheel components 60 are provided on each of the first chassis 10 and the second chassis 20, and the cushion components 70 are provided to ensure that the four wheels (two driving wheels and two universal wheels 62) on each chassis can support the same surface (chassis), thus improving the stability of the chassis 311.

It is to be understood that the second robot of the present disclosure also includes a chassis in the above embodiment. For the specific structure of the chassis of the second robot, referring to the description of the first robot above, which will not be repeated here.

In an embodiment, at least one of the first robot and the second robot of the present disclosure includes a chassis and a gantry. The gantry is provided on the chassis. A lower end of the gantry is rotatably connected with the chassis to enable the gantry to switch between a vertical state and a roughly horizontal state. The first container pickup mechanism or second container pickup mechanism is liftably provided on the gantry and used for picking up and placing containers on inventory receptacles.

The gantry comprises at least two frame segments spliced along a height direction. Adjacent two frame segments are detachably connected. A lower end of the bottommost frame segment is rotatably connected with the chassis.

It is to be understood that the gantry of the first robot is a first lifting gantry. The first lifting gantry is provided on the chassis of the first robot. A lower end of the first lifting gantry is rotatably connected with the chassis of the first robot. The first container pickup mechanism is liftably provided on the first lifting gantry. It is to be understood that the gantry of the second robot is a second lifting gantry. The second lifting gantry is provided on the chassis of the second robot. A lower end of the second lifting gantry is rotatably connected with the chassis of the second robot. The second container pickup mechanism is liftably provided on the second lifting gantry.

Description will be made below by taking the first robot as an example. Referring to FIG. 30 to FIG. 35, a conveying robot provided by this embodiment includes a movable chassis 311, a first lifting gantry 32, a first container pickup mechanism 34 and a lifting component 35. The movable chassis 311 has an autonomous mobility function. The first lifting gantry 32 is provided on the movable chassis 311. One end of the first lifting gantry 32 is rotatably connected with the movable chassis 311, so that the first lifting gantry 32 can switch between a vertical state and a roughly horizontal state. The first container pickup mechanism 34 is liftably provided on the first lifting gantry 32 through the lifting component 35, and is used for achieving the conveying of containers between the first lifting gantry 32 and the inventory receptacles.

In the conveying robot provided by this embodiment, by rotatably connecting the lower end of the first lifting gantry 32 with the movable chassis 311, the first lifting gantry 32 can switch between the roughly horizontal state and the vertical state, thus enabling the conveying robot to be in a vertical state during normal use and achieving the conveying of containers. When the conveying robot is assembled, the first lifting gantry 32 is firstly enabled to be in the roughly horizontal state, structures such as the lifting component 35 and the first container pickup mechanism 34 are assembled on the first lifting gantry 32, then one end of the first lifting gantry 32 is rotatably connected with the movable chassis 311, the first lifting gantry 32 is enabled to be in the vertical state by rotating the first lifting gantry 32, thus achieving the assembling of the conveying robot. That is, in the conveying robot provided by this embodiment, the assembling of the structures on the first lifting gantry 32 can be achieved when the first lifting gantry 32 is in the roughly horizontal state, thus avoiding high-altitude operation due to the excessive height of the first lifting gantry 32, reducing the assembling difficulty and cost, and improving the assembling efficiency.

It is to be stated that, the gantry being in the roughly horizontal state described above and below refers to that the length direction of the gantry is parallel to the horizontal direction, or a small angle is formed between the length direction of the gantry and the horizontal direction, such as an angle of less 20°.

In an embodiment, the movable chassis 311 is rotatably connected with the first lifting gantry 32. An upper end surface of the movable chassis 311 is provided with a rotatable connecting block. The rotatable connecting block is detachably connected with the movable chassis 311. A first shaft hole is provided in the rotatable connecting block. The lower end of the first lifting gantry 32 is connected with a connecting block. A second shaft hole is provided in the connecting block. The first shaft hole is directly opposite to the second shaft hole. A rotating shaft is provided in the first shaft hole and the second shaft hole. The rotating shaft extends along the first direction. The first lifting gantry 32 can rotate around the axis of the rotating shaft.

In this embodiment, two connecting blocks are provided at an interval along the second direction. The rotatable connecting block and the rotating shaft are provided corresponding to the connecting blocks one to one. The connecting blocks are mounted at two ends of the first lifting gantry 32 along the first direction to avoid interference between the rotatable connecting block and the rotating shaft. However, it is to be understood that the rotatable connecting structure between the movable chassis 311 and the first lifting gantry 32 is only an exemplary structure. Any structure in the existing technology that can achieve the rotatable connection between the first lifting gantry 32 and the movable chassis 311 to achieve the switching of the first lifting gantry 32 between the vertical state and the roughly horizontal state still falls within the scope of protection of the present disclosure.

The switching of the first lifting gantry 32 between the vertical state and the roughly horizontal state can be achieved by manually rotating the first lifting gantry 32, or by using a rotation driving device for automatic driving. Exemplarily, the rotation driving device is provided independently relative to the conveying robot. In addition, the rotation driving device is detachably connected with the first lifting gantry 32. Therefore, after the conveying robot is assembled and debugged, the rotation driving device can be removed from the conveying robot, thus avoiding the situation that the conveying robot carries the rotation driving device to work, reducing the load on the conveying robot, and improving the use flexibility of the rotation driving device.

Exemplarily, the rotation driving device adopts a piston cylinder for driving. A cylinder body of the piston cylinder is fixed on the ground where the conveying robot is located through a mounting bracket to achieve the fixation of the cylinder body relative to the movable chassis 311. The end of a piston rod is detachably connected onto the first lifting gantry 32. The piston rod is provided at a set angle relative to the horizontal direction, so that the extension action of the piston rod drives the first lifting gantry 32 to rotate.

The structure of the rotation driving device is only an exemplary structure. In other embodiments, the structural forms of other existing rotation driving devices may also be used for achieving the rotation of the first lifting gantry 32. For example, a rotary motor is connected with the rotating shaft directly or through a transmission component to drive the rotating shaft to rotate, thus driving the first lifting gantry 32 to rotate. The existing structures of the rotation driving devices that can achieve the rotation of structures with larger length dimensions are relatively common, which are specifically limited in the present disclosure.

In order to ensure the structural stability of the first lifting gantry 32 in the vertical state, the conveying robot further includes a locking component. The locking component is used for locking the relative position of the first lifting gantry 32 and the movable chassis 311 when the first lifting gantry 32 is in the vertical state. Exemplarily, in this embodiment, the locking component includes several threaded parts. The upper end surface of the movable chassis 311 is provided with threaded holes. The lower end of the first lifting gantry 32 is provided with connecting through holes. The movable chassis 311 is tightly connected with the first lifting gantry 32 through the threaded parts passing through the threaded holes and the connecting through holes. That is, when the first lifting gantry 32 is in the horizontal position, the first lifting gantry 32 is rotatably connected with the movable chassis 311 through the rotating shaft. After the first lifting gantry 32 is in the vertical state, the first lifting gantry 32 is tightly connected with the movable chassis 311 through the threaded parts.

Referring to FIG. 30 to FIG. 33, in order to further reduce the difficulty in manufacturing and assembling the conveying robot and improve the convenience in picking up and placing high-level inventory receptacles, exemplarily the first lifting gantry 32 includes at least two frame segments 321 spliced along the extension direction. Adjacent two frame segments 321 are detachably connected. A lower end of the bottommost frame segment 321 is rotatably connected with the movable chassis 311. By adopting such arrangement, when the height of the first lifting gantry 32 is great, the length of each frame segment 321 can be reduced by dividing the first lifting gantry 32 into several spliced frame segments 321, thus reducing the difficulty in manufacturing, conveying and assembling the first lifting gantry 32, and improving the conveying convenience and stability before assembling.

In this embodiment, three frame segments 321 are provided. However, the present disclosure is not limited thereto. The number of the frame segments 321 may be specifically set according to the total length of the first lifting gantry 32. Exemplarily, the height of each frame segment 321 is between 1 m and 2 m, so as to facilitate the conveying of each frame segment 321.

Further, the size of each frame segment 321 along the first direction is greater than the size of the frame segment 321 in the second direction. The second direction is perpendicular to the first direction. Before the several frame segments 321 are spliced, the several frame segments 321 may be arranged side by side on the movable chassis 311 in the second direction. By adopting such arrangement, structures such as the frame segments 321 can be placed on the movable chassis 311. By moving the movable chassis 311, structures such as the frame segments 321 to be assembled can be moved to the assembling station, thus improving the convenience in conveying the components of the robot, further reducing the assembling cost and improving the assembling efficiency.

In order to improve the convenience in placing the frame segments 321 on the movable chassis 311, the size of the movable chassis 311 in the first direction is smaller than the size of the movable chassis 311 in the second direction. Exemplarily, the size of the movable chassis 311 in the second direction is greater than 1.5 times the size in the first direction.

Further, two side surfaces of the movable chassis 311 that are provided opposite to each other at an interval along the first direction are in parallel, and the side surfaces are perpendicular to the second direction, thus ensuring the layout space of the first lifting gantry 32 and improving the compactness of the structure. Two side surfaces of the movable chassis 311 that are provided opposite to each other at an interval along the second direction are arc-shaped surfaces. Two ends of the arc-shaped surfaces are respectively connected with the parallel side surfaces, so as to improve the appearance attractiveness of the movable chassis 311.

In order to improve the arrangement stability of the first lifting gantry 32 in the roughly horizontal state, each frame segment 321 is provided with auxiliary supporting parts. When the gantry is in the roughly horizontal state, the auxiliary supporting parts are supported on the ground, so as to avoid the problem that the frame segment 321 is easily curved since the ends of the frame segment 321 are suspended in air, and improve the arrangement stability of the frame segment 321, thus helping to assemble the first lifting gantry 32 and mount other structures on the first lifting gantry 32. Exemplarily, the auxiliary supporting parts may be detachably connected with the frame segment 321, so that the auxiliary supporting parts can be removed from the frame segment 321 after the conveying robot is assembled, thus avoiding the situation that the arrangement of the auxiliary supporting parts influences the conveying of containers by the conveying robot.

In order to facilitate the conveying of containers by the first container pickup mechanism 34, each frame segment 321 includes two supporting racks 3211 provided opposite to each other at an interval along the first direction. A space for the movement of the first container pickup mechanism 34 is formed between the two supporting racks 3211. The bottommost frame segment 321 further includes a bottom rack 3212 connected between bottom ends of the two supporting racks 3211. The bottom rack 3212 is provided on the upper end surface of the movable chassis 311, so as to increase the contact area with the movable chassis 311, and improve the assembling stability and connection reliability of the first lifting gantry 32 and the movable chassis 311. Further, the topmost frame segment 321 further includes a top rack 3213 connected between two ends of the supporting racks 3211. The arrangement of the top rack 3213 is used for preventing relative shaking between the two supporting racks 3211 when the first lifting gantry 32 is too high, thus further improving the stability of the first lifting gantry 32.

In this embodiment, exemplarily, each supporting rack 3211 includes two supporting rods 32111 provided opposite to each other at an interval along the second direction. Connecting rods 32112 are connected between the two supporting rods 32111. In addition, a plurality of connecting rods 32112 are provided at an interval along the length direction of the supporting rods 32111. By adopting such arrangement, the weight and arrangement cost of the supporting racks 3211 can be reduced while the structural strength and stiffness of the supporting racks 3211 are ensured. Exemplarily, the supporting rods 32111 and the connecting rods 32112 are made of square steel to further simplify the manufacturing.

In order to improve the convenience of connection between the two frame segments 321, the ends of each supporting rack 3211 are connected with connecting seats 32113. The connecting seats 32113 are provided with connecting plates perpendicular to the splicing direction. The connecting plates at the splicing position of the two frame segments 321 abut against each other. The two connecting plates in contact with each other may be detachably connected through bolts. In other embodiments, adjacent two frame segments 321 may also be connected by adopting other connecting structures. For example, butting rods are provided between the ends of two supporting frames 3211. The butting rods between the adjacent two frame segments 321 abut against each other. The butting rods of the adjacent two frame segments 321 are detachably connected through bolts.

Further, the first lifting gantry 32 further includes connectors 322. The supporting rods 32111 are hollow rods. The two ends of the connectors 322 are respectively inserted into the supporting rods 32111 of the adjacent two frame segments 321. The connectors 322 are detachably connected with the corresponding supporting rods 32111. By providing the connectors 322, the stability and reliability of the connection between adjacent frame segments 321 can be improved, and the structural strength and stiffness of the splicing position between two frame segments 321 can be improved.

It is to be understood that in other embodiments, the frame segments 321 may also adopt other structures. For example, the main bodies of the two supporting racks 3211 of the frame segment 321 may be plate structures, as long as the mounting, supporting and operation of the entire first container pickup mechanism 34 and the lifting component 35 can be achieved.

Figure 34:
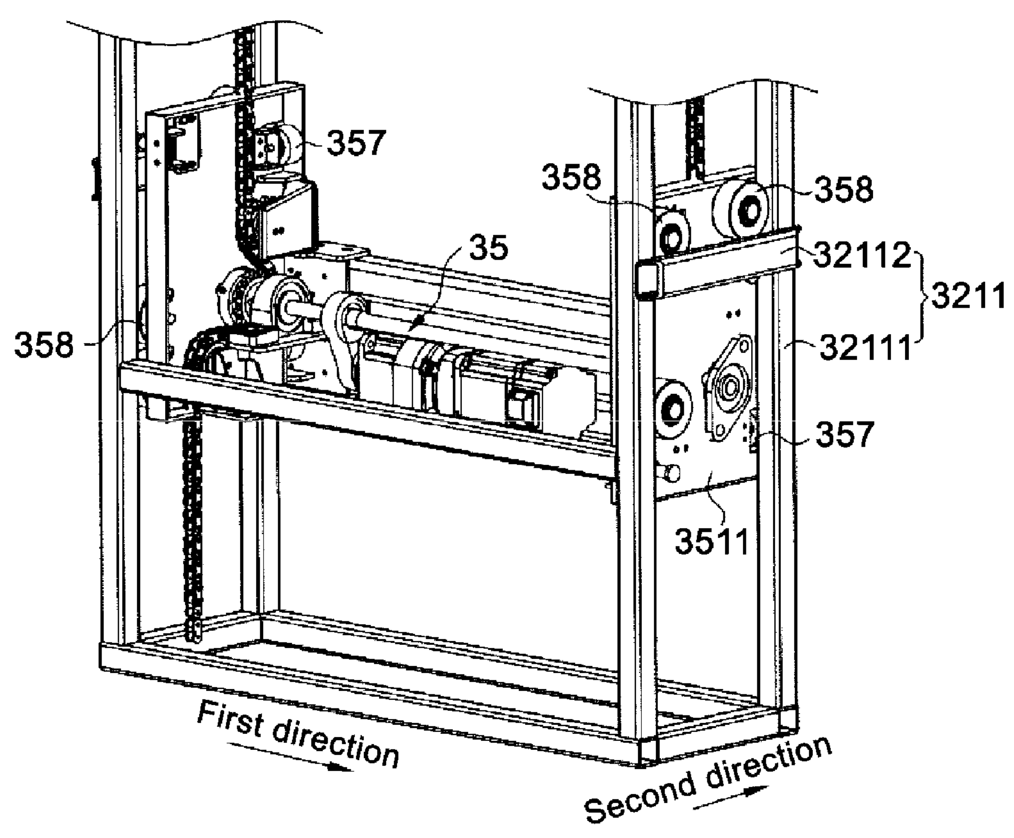
FIG. 34 illustrates a schematic partial structural diagram of a gantry and a lifting mechanism provided by the present disclosure.
Figure 35:
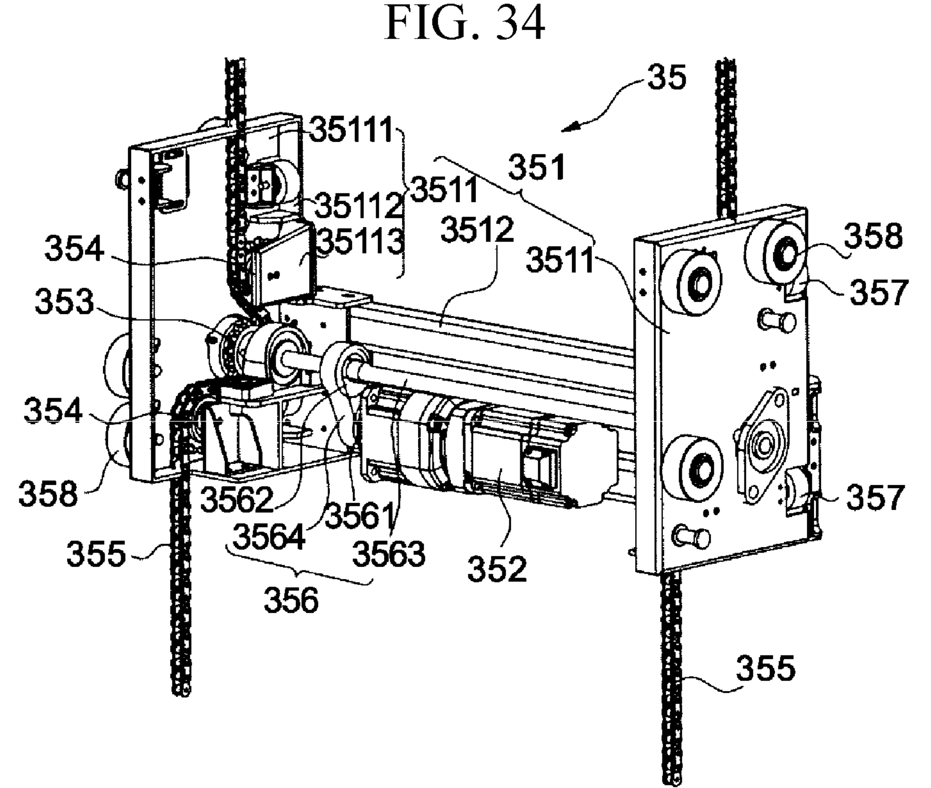
FIG. 35 illustrates a schematic structural diagram of a lifting mechanism provided by the present disclosure.

Referring to FIG. 34 and FIG. 35, in this embodiment, the lifting component 35 includes a lifting rack 351 and a driving transmission component. The driving transmission component can drive the lifting rack 351 to move in the height direction of the first lifting gantry 32. The first container pickup mechanism 34 is detachably provided on the lifting rack 351. Such arrangement facilitates the mounting and dismounting of the first container pickup mechanism 34, such that the first container pickup mechanism 34 can be assembled on the whole and then mounted on the lifting rack 351, thus improving the mounting efficiency of the first container pickup mechanism 34.

Exemplarily, the driving transmission component adopts chain transmission, and includes a lifting driving motor 352 and sprocket-chain components. Each sprocket-chain component includes a driving sprocket 353, driven sprockets 354 and a chain 355. The lifting driving motor 352 is mounted on the lifting rack 351, and a driving shaft thereof is provided along the first direction. The driving sprocket 353 is in transmission connection with the driving shaft of the lifting driving motor 352. Two driven sprockets 354 are provided. The two driven sprockets 354 are respectively located on upper and lower sides of the driving sprocket 353. Centers of the driving sprocket 353 and the two driven sprockets 354 are not in the same straight line. The chain 355 is provided along the extension direction of the first lifting gantry 32. Upper and lower ends of the chain are fixedly provided on the first lifting gantry 32. The chain 355 is sequentially wound on one driven sprocket 354, the driving sprocket 353 and the other driven sprocket 354. Therefore, the chain 355 forms an Ω-shaped structure at the driving sprocket 353 and the driven sprockets 354.

By adopting the structural arrangement of the driving transmission component, the chain 355 can be fixedly mounted on the first lifting gantry 32, so that during the operation of the lifting component 35, the chain 355 remains in a stable position, that is, the chain 355 can be assembled when the first lifting gantry 32 is in the horizontal position, and the lifting drive motor 352, the lifting gantry 351 and the like can be assembled at the bottom of the first lifting gantry 32 when the first lifting gantry 32 is in the vertical position, thus reducing the assembling difficulty and improving the assembling convenience.

Exemplarily, one sprocket-chain component is provided on the supporting rack 3211 on each side (a set of supporting racks is formed by the supporting racks 3211 of several frame segments 321 on the same side), so as to improve the stability and reliability of lifting transmission. Further, the lifting driving motor 352 is in transmission connection with two driving sprockets 353 located on two sides through a synchronous transmission component 256, so as to reduce the number of the lifting driving motors 352 and improve the transmission synchronism of the sprocket-chain components on the two sides. In other embodiments, one lifting driving motor 352 may be provided corresponding to each sprocket-chain component.

The synchronous transmission component 256 includes a synchronous shaft 3563 horizontally provided along the first direction, a driving pulley 3561 provided on the driving shaft of the lifting driving motor 352 in a sleeving manner, a driven pulley 3562 provided on the synchronous shaft 3563 in a sleeving manner, and a synchronous belt 3564 wound on the driving pulley 3561 and the driven pulley 3562. The two driving sprockets 353 are respectively provided on two ends of the synchronous shaft 3563 in a sleeving manner. The rotation of the lifting driving motor 352 is transmitted to the synchronous belt 3564 through the driving pulley 3561, and transmitted to the synchronous shaft 3563 through the synchronous belt 3564 and the driven pulley 3562, thus driving the synchronous shaft 3563 to rotate, that is, driving the driving sprockets 353 provided on the synchronous shaft 3563 to rotate.

In this embodiment, by using a chain transmission structure as the lifting component 35, the cost of the lifting component 35 can be reduced, the assembling and maintenance of the lifting driving mechanism can be facilitated, and the service life of the lifting component 35 can be improved. In other embodiments, the sprocket-chain components may also be replaced with other lifting transmission components that can convert the rotation of the motor into linear movement, such as gear-rack components or lead screw nut components.

In order to facilitate the mounting of the driving transmission component, the lifting rack 351 includes two mounting plate racks 3511 provided opposite to each other at an interval, and a mounting cross rack 3512 connected between the two mounting plate racks 3511. The lifting driving motor 352 is mounted on the mounting cross rack 3512. The two ends of the synchronous shaft 3563 are rotatably mounted on the two mounting plate racks 3511. The driven sprockets 354 are rotatably mounted on the mounting plate racks 3511 on the corresponding sides.

Each mounting plate rack 3511 mainly includes a main mounting plate 35111. The main mounting plate 35111 is perpendicular to the first direction. Four sides thereof are bent inwards to form folded side parts 35112. Each mounting plate rack 3511 further includes sprocket mounting seats 35113 provided opposite to the main mounting plate 35111 at an interval. The sprocket mounting seats 35113 are detachably connected with the folded side parts 35112. The driven sprockets 354 are rotatably mounted on the sprocket mounting seats 35113. The driven sprockets 354 are located between the sprocket mounting seats 35113 and the main mounting plate 35111. By adopting such arrangement, the driven sprockets 354 can be covered, thus preventing the first container pickup mechanism 34 or external structure from colliding with the driven sprockets 354.

In order to further improve the operation stability of the lifting component 35, the lifting component 35 further includes lifting guide components. The mounting plate racks 3511 are slidably connected with the supporting racks 3211 on the corresponding sides through the lifting guide components.

Specifically, in this embodiment, each lifting guide component includes a first guide wheel set. The first guide wheel set includes first guide wheels 357. The first guide wheels 357 are rotatably mounted on the mounting plate rack 3511. The rotation axis of the first guide wheels 357 is set along the second direction. The first guide wheels 357 are in rolling contact with one side of the supporting rod 32111 towards the supporting rack 3211 on the other side. One first guide wheel set is correspondingly provided on each supporting rack 3211. By providing the first guide wheels 357, the limiting of the lifting rack 351 in the first direction can be achieved, and the guide stability and reliability can be further improved.

Exemplarily, the main mounting plate 35111 is provided with avoidance openings. Rotating shafts of the first guide wheels 357 are located on the inner side of the main mounting plate 35111. The first guide wheels 357 are partially exposed out of the outer side of the main mounting plate 35111 through the avoidance openings and are in rolling contact with the supporting rod 32111. By providing the avoidance openings, the size of the first guide wheels 357 can be reduced, and the distance between the main mounting plates 35111 and the supporting rods 32111 can be reduced at the same time, thus increasing the space between the two main mounting plates 35111, improving the structural compactness, and reducing the structural interference with the first container pickup mechanism 34. In other embodiments, the first guide wheels 357 may also be directly mounted on the outer side of the main mounting plate 35111.

Further, the lifting guide component further includes a second guide wheel set. The second guide wheel set includes at least two second guide wheels 358. The second guide wheels 358 are rotatably mounted on one side of one mounting plate rack 3511 away from the other mounting plate rack 3511. The rotation axis of the second guide wheels 358 is set along the first direction. The at least two second guide wheels 358 are respectively in rolling contact with opposite sidewalls of the two supporting rods 32111 of the supporting rack 3211. By providing the second guide wheels 358, the lifting rack 351 can be prevented from moving along the second direction relative to the first lifting gantry 32, thus improving the movement stability of the lifting rack 351.

Further, the supporting rods 32111 on each side (several supporting rods arranged side by side along the extension direction of the supporting rods form a set of supporting rods) may be correspondingly provided with two or more second guide wheels 358. The number of the second guide wheels 358 on the supporting rods 32111 on the two sides may be the same or different. In addition, the second guide wheels may be provided facing to each other or staggered from each other along the extension direction of the supporting rods 32111, as long as each supporting rod 32111 on each side is correspondingly provided with at least one second guide wheel 358.

In this embodiment, each of the first guide wheels 357 and the second guide wheels 358 includes a mounting shaft, a bearing provided on the mounting shaft in a sleeving manner, and a roller provided outside the bearing in a sleeving manner. The roller is fixed to an outer circumference of the bearing. The mounting shaft is fixed to an inner circumference of the bearing. In other embodiments, the first guide wheels 357 and the second guide wheels 358 may also be other existing roller structures, which is not further limited in this embodiment.

The first container pickup mechanism 34 is detachably mounted on the lifting rack 351. The first container pickup mechanism 34 may be a structure in patent application 202010524246.4, or other existing structures of the first container pickup mechanism 34. The structure of the first container pickup mechanism 34 is not specifically limited in the present disclosure.

Figures 30, 31:
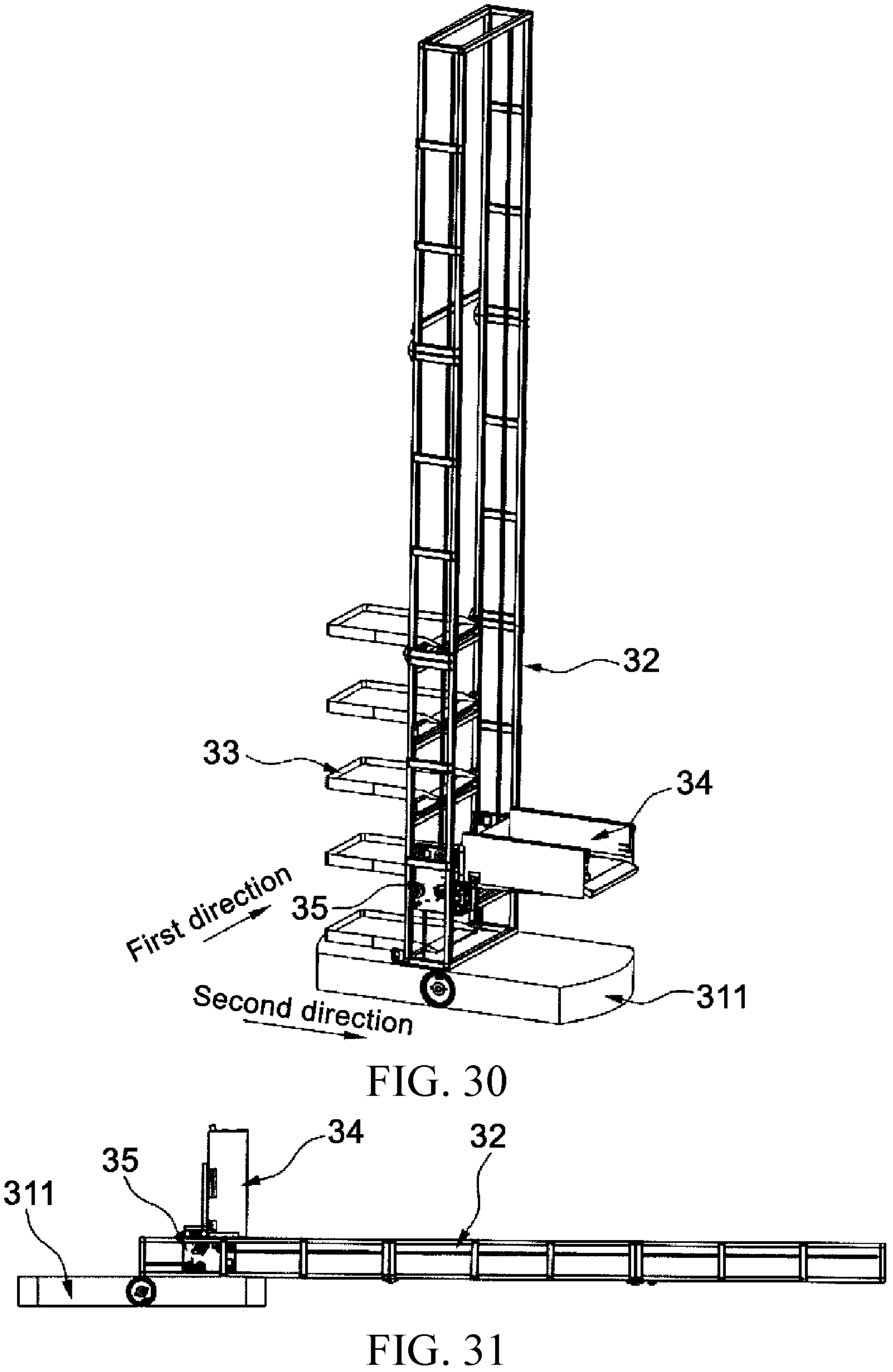
FIG. 30 illustrates a schematic structural diagram of a conveying robot when a gantry is in a vertical state provided by the present disclosure.
FIG. 31 illustrates a schematic structural diagram of a conveying robot when a gantry is in a roughly horizontal state provided by the present disclosure.
Figures 32, 33:
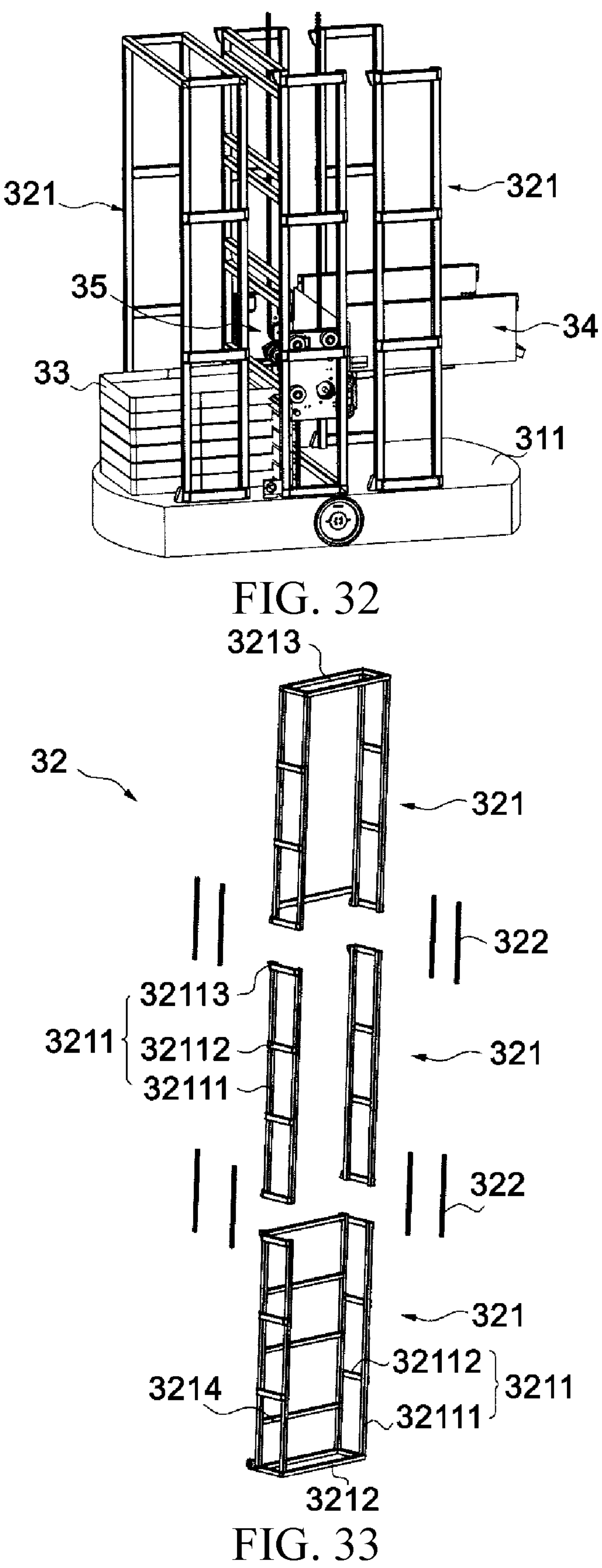
FIG. 32 illustrates a schematic structural diagram of a conveying robot in an assembled and conveying state provided by the present disclosure.
FIG. 33 illustrates a schematic disassembled structural diagram of a gantry provided by the present disclosure.

Further, referring to FIG. 30, the conveying robot further includes several first temporary storage mechanisms 33. The several first temporary storage mechanisms 33 are provided at an interval along the extension direction of the first lifting gantry 32. In addition, the first temporary storage mechanisms 33 are detachably connected with the first lifting gantry 32. By providing the first temporary storage mechanisms 33 detachably connected with the first lifting gantry 32, the first temporary storage mechanisms 33 can be assembled after the first lifting gantry 32 is mounted in the horizontal state, thus improving the assembling efficiency.

Exemplarily, the several first temporary storage mechanisms 33 are mounted on the bottommost frame segments 321. In addition, in the initial mounted state, the first container pickup mechanism 34 and the first temporary storage mechanisms 33 are respectively located on two opposite sides of the first lifting gantry 32. By adopting such arrangement, the first temporary storage mechanisms 33 can be assembled when the first lifting gantry 32 is in the vertical state, so as to prevent the first lifting gantry 32 from scratching the first temporary storage mechanisms 33 during state switching. Moreover, the first temporary storage mechanisms 33 are provided on the lower frame segments 321 and can be directly mounted manually, thus making mounting faster and more convenient, and reducing the overall center of gravity of the assembled conveying robot.

In this embodiment, the number of the first temporary storage mechanisms 33 is six. In other embodiments, the number and position of the first temporary storage mechanisms 33 may be specifically limited according to the needs.

It is to be understood that the second robot of the present disclosure also includes a gantry and a lifting component in the above embodiment. For the specific structure of the second robot, referring to the description of the first robot above, which will not be repeated here.

Based on the concept of the system, the present disclosure further provides a robot. It may be considered that the robot includes the second robot in the above embodiment. For the structure of the robot, referring to the structure of the second robot described above. The work tasks performed by the robot are similar to those performed by the second robot, which will not be repeated here. The robot can be used for conveying containers with different sizes and can improve the utilization rate of the container storage space where the conveyable target container is located.

What are described above are just exemplary embodiments of the present disclosure, which are embodiments based on the overall concept of the present disclosure. However, the scope of protection of the present disclosure is not limited thereto. Any changes or replacements that can be easily imagined by those skilled in the art within the technical scope of the present disclosure still fall within the scope of protection of the present disclosure.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

What is claimed is:

1. A container conveying system, comprising: containers with various container sizes, a controller, and a first robot and a second robot, wherein a first container pickup mechanism is provided on the first robot, a second container pickup mechanism is provided on the second robot, the first robot is capable of conveying containers with container sizes within a first size range, and the second robot is capable of conveying containers with container sizes within a second size range;

a container pickup size of at least one of the first container pickup mechanism and the second container pickup mechanism is adjustable;

the controller is configured to, in response to a container conveying request, send a first conveying instruction to the first robot in a case that it is determined that a target container to be conveyed based on the container conveying request has a size within the first size range; or send a second conveying instruction to the second robot in a case that it is determined that the target container to be conveyed based on the container conveying request has a size within the second size range;

the first robot is configured to use the first container pickup mechanism to acquire and convey the target container in response to the first conveying instruction; and the second robot is configured to use the second container pickup mechanism to acquire and convey the target container in response to the second conveying instruction, wherein at least one of the first robot and the second robot comprises:

a chassis; and a gantry provided on the chassis, wherein a corresponding one of the first container pickup mechanism or the second container pickup mechanism is provided on the gantry in a liftable manner, supporting mechanisms are provided on two opposite sides of the gantry, and the supporting mechanisms are configured to be triggered to be unfolded so that they are respectively supported on inventory receptacles at two sides of the corresponding robot where they are located in a case that the corresponding container pickup mechanism of the corresponding robot is raised to a set height.

2. The container conveying system according to claim 1, wherein at least one of the following is met:

a container pickup size of the second container pickup mechanism is adjustable, and the controller is configured to determine a target container size of the target container in a case that it is determined that the target container to be conveyed based on the container conveying request has a size within the second size range, and generate the second conveying instruction based on the target container size; and the second robot is configured to, in response to the second conveying instruction, adjust a container pickup size of the second container pickup mechanism to match the target container size, and use the adjusted second container pickup mechanism to acquire and convey the target container; and a container pickup size of the first container pickup mechanism is adjustable, the controller is configured to determine a target container size of the target container in a case that it is determined that the target container to be conveyed based on the container conveying request has a size within the first size range, and generate the first conveying instruction based on the target container size; and the first robot is configured to, in response to the first conveying instruction, adjust a container pickup size of the first container pickup mechanism to match the target container size, and use the adjusted first container pickup mechanism to acquire and convey the target container.

3. The container conveying system according to claim 2, wherein a third sensor component is provided on the first container pickup mechanism; and the first robot is configured to, in response to the first conveying instruction, move to a container pickup position of the target container, use the third sensor component to collect the target container size of the target container, adjust the container pickup size of the first container pickup mechanism based on the target container size to match the target container size, and use the adjusted first container pickup mechanism to acquire and convey the target container.

4. The container conveying system according to claim 1, wherein a container pickup size of the second container pickup mechanism is adjustable, a first sensor component is provided on the second container pickup mechanism; and the second robot is configured to, in response to the second conveying instruction, move to a container pickup position of the target container, use the first sensor component to collect a target container size of the target container, adjust a container pickup size of the second container pickup mechanism based on the target container size to match the target container size, and use the adjusted second container pickup mechanism to acquire and convey the target container.

5. The container conveying system according to claim 1, wherein a container pickup size of the second container pickup mechanism is adjustable, the second container pickup mechanism comprises a second telescopic arm hooking mechanism, a second adjustment mechanism and a first motor, the first motor being connected with the second adjustment mechanism, and the second adjustment mechanism being configured to drive the second telescopic arm hooking mechanism to move under the drive of the first motor to adjust a container pickup size of the second container pickup mechanism.

6. The container conveying system according to claim 5, wherein the second adjustment mechanism comprises a first belt component, the first belt component comprises a first belt and a first pulley, and a driving block is provided on the first belt, the second telescopic arm hooking mechanism is provided on the driving block; and the first motor is provided at one end of the first belt component, the first pulley rotates under the drive of the first motor, the first belt moves under the drive of the first pulley, the driving block moves under the drive of the first belt, and the second telescopic arm hooking mechanism moves under the drive of the driving block to adjust the container pickup size of the second container pickup mechanism.

7. The container conveying system according to claim 6, wherein the second adjustment mechanism further comprises a first guide rail, and the second telescopic arm hooking mechanism comprises a movable seat and an insertion part; and the insertion part is provided on the movable seat, the movable seat is provided on the driving block and is slidably provided on the first guide rail.

8. The container conveying system according to claim 7, wherein the second container pickup mechanism is further provided with a second motor and a second belt component, and the insertion part is fixedly connected onto a third belt of the second belt component, the third belt of the second belt component being provided on the movable seat; and the third belt of the second belt component drives the insertion part to move under the drive of the second motor to acquire the target container.

9. The container conveying system according to claim 5, wherein the second adjustment mechanism comprises a lead screw component, and the lead screw component comprises a screw and a nut, the second telescopic arm hooking mechanism is provided on the nut, and the screw is connected to the nut in a sleeving manner; and the first motor is provided at one end of the lead screw component, the screw rotates under the drive of the motor, the nut moves along the screw under the drive of the screw, and the second telescopic arm hooking mechanism moves under the drive of the nut to adjust the container pickup size of the second container pickup mechanism.

10. The container conveying system according to claim 5, wherein a telescopic direction of the second telescopic arm hooking mechanism is perpendicular to a moving direction of the second robot.

11. The container conveying system according to claim 1, wherein a container pickup size of the second container pickup mechanism is adjustable, and the controller is configured to determine a target container size of the target container in a case that it is determined that the target container to be conveyed based on the container conveying request has a size within the second size range, and generate the second conveying instruction based on the target container size; and the second robot is configured to, in response to the second conveying instruction, adjust a container pickup size of the second container pickup mechanism to match the target container size;

the second robot is further provided with a second sensor component that is configured to collect an actual container size of the target container as a container check size; and the second robot is configured to, after adjusting the container pickup size of the second container pickup mechanism to match the target container size, determine whether the container check size obtained from the second sensor component matches the target container size, and use the adjusted second container pickup mechanism to acquire and convey the target container in a case that the container check size matches the target container size, or re-adjust the second container pickup mechanism based on the container check size in a case that the container check size does not match the target container size, and then use the re-adjusted second container pickup mechanism to acquire and convey the target container.

12. The container conveying system according to claim 1, wherein the second robot comprises the chassis and the gantry, the second container pickup mechanism is provided on the gantry, the gantry being provided on a central axis of a second robot body and comprising a second guide rail, and the second container pickup mechanism is slidably connected with the second guide rail and is slidable along the second guide rail.

13. The container conveying system according to claim 12, wherein the second robot is provided with a plurality of second temporary storage mechanisms at one side of the gantry away from the second container pickup mechanism; and the second container pickup mechanism is configured to place the target container on the second temporary storage mechanism after acquiring the target container.

14. The container conveying system according to claim 1, wherein the first robot comprises a first robot body, the gantry and a first temporary storage mechanism, and the first container pickup mechanism is provided on the gantry, the gantry being provided on a central axis of the first robot body;

the gantry comprises a third guide rail, the first container pickup mechanism is slidably connected with the third guide rail and is slidable along the third guide rail; and the first temporary storage mechanism is provided at one side of the gantry away from the first container pickup mechanism, and the first container pickup mechanism is configured to place the target container on the first temporary storage mechanism after acquiring the target container.

15. The container conveying system according to claim 1, wherein the at least one of the first robot and the second robot further comprises:

a lifting component configured to move upwards and downwards along the gantry; and at least two auxiliary supporting devices controlled by respective driving components, the at least two auxiliary supporting devices are disposed on two opposite sides of the corresponding robot, respectively, and are configured to extend relative to the corresponding robot to abut against or separate from material racks serving as inventory receptacles at two sides of the corresponding robot.

16. The container conveying system according to claim 15, wherein each auxiliary supporting device comprises a fixed base and a supporting element connected onto the fixed base in a retractable manner through a telescopic mechanism, and the telescopic mechanism is controlled by the driving component and configured to drive the supporting element to move relative to the fixed base to abut against or separate from the material rack at the corresponding side.

17. The container conveying system according to claim 1, wherein each supporting mechanism has an unfolded state in which the supporting mechanism is supported against the inventory receptacle and a folded state in which the supporting mechanism is folded on the gantry, and the corresponding container pickup mechanism is capable of actuating the supporting mechanism when lifted to the set height, so that the supporting mechanism is unfolded.

18. The container conveying system according to claim 1, wherein:

a lower end of the gantry is rotatably connected with the chassis so that the gantry is switchable between a vertical state and a roughly horizontal state, and each of the first container pickup mechanism and the second container pickup mechanism is configured to pick up and place a container on an inventory receptacle.

19. The container conveying system according to claim 1, wherein the gantry comprises at least two frame segments spliced along a height direction, with every two adjacent frame segments being detachably connected to each other, and a lower end of the bottommost frame segment being rotatably connected with the chassis.

20. A container conveying system, comprising: containers with various container sizes, a controller, and a first robot and a second robot, wherein a first container pickup mechanism is provided on the first robot, a second container pickup mechanism is provided on the second robot, the first robot is capable of conveying containers with container sizes within a first size range, and the second robot is capable of conveying containers with container sizes within a second size range;

a container pickup size of at least one of the first container pickup mechanism and the second container pickup mechanism is adjustable;

the controller is configured to, in response to a container conveying request, send a first conveying instruction to the first robot in a case that it is determined that a target container to be conveyed based on the container conveying request has a size within the first size range; or send a second conveying instruction to the second robot in a case that it is determined that the target container to be conveyed based on the container conveying request has a size within the second size range;

the first robot is configured to use the first container pickup mechanism to acquire and convey the target container in response to the first conveying instruction; and the second robot is configured to use the second container pickup mechanism to acquire and convey the target container in response to the second conveying instruction, wherein at least one of the first robot and the second robot comprises:

a chassis;

a gantry provided on the chassis, a lower end of the gantry being rotatably connected with the chassis so that the gantry is switchable between a vertical state and a roughly horizontal state, and a corresponding one of the first container pickup mechanism and the second container pickup mechanism is provided on the gantry in a liftable manner and is configured to pick up and place a container on an inventory receptacle.

* * * * *